(12) United States Patent
Welle

(10) Patent No.: US 11,492,147 B2
(45) Date of Patent: Nov. 8, 2022

(54) STACKABLE SATELLITE STRUCTURE AND DEPLOYMENT METHOD

(71) Applicant: The Aerospace Corporation, El Segundo, CA (US)

(72) Inventor: Richard P. Welle, Huntington Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 126 days.

(21) Appl. No.: 16/943,203

(22) Filed: Jul. 30, 2020

(65) Prior Publication Data

US 2022/0033111 A1 Feb. 3, 2022

(51) Int. Cl.
*B64G 1/64* (2006.01)
*B64G 1/10* (2006.01)

(52) U.S. Cl.
CPC ........... *B64G 1/641* (2013.01); *B64G 1/1085* (2013.01); *B64G 2001/643* (2013.01)

(58) Field of Classification Search
CPC ...... B64G 1/641; B64G 1/1085; B64G 1/643; B64G 1/64; B64G 2001/1092; B64G 1/66; B64G 1/10; B64G 2001/643; B64G 1/222; B64G 1/244; B64G 1/443
See application file for complete search history.

(56) References Cited

U.S. PATENT DOCUMENTS

| 3,324,470 | A | | 6/1967 | Morse | |
|---|---|---|---|---|---|
| 5,052,640 | A | * | 10/1991 | Chang | B64G 1/002 244/172.7 |
| 5,522,569 | A | * | 6/1996 | Steffy | B64G 1/222 244/172.6 |
| 5,641,135 | A | | 6/1997 | Stuart et al. | |
| 5,884,866 | A | | 3/1999 | Steinmeyer et al. | |
| 5,996,940 | A | | 12/1999 | McVey et al. | |
| 9,415,883 | B2 | | 8/2016 | Holemans et al. | |
| 10,661,918 | B2 | * | 5/2020 | Schwarz | B64G 1/10 |
| 2014/0319283 | A1 | | 10/2014 | Holemans et al. | |
| 2016/0318635 | A1 | * | 11/2016 | Field | B64G 1/641 |
| 2017/0355474 | A1 | * | 12/2017 | Busche | B64G 1/22 |
| 2018/0111707 | A1 | * | 4/2018 | Poncet | B64G 1/645 |
| 2019/0023419 | A1 | | 1/2019 | Helvajian | |
| 2019/0023424 | A1 | | 1/2019 | Helvajian et al. | |
| 2020/0365512 | A1 | * | 11/2020 | Rothschild | H01L 21/78 |
| 2020/0365966 | A1 | * | 11/2020 | Honour | B64G 1/66 |

FOREIGN PATENT DOCUMENTS

| EP | 3254973 A1 | 12/2017 |
|---|---|---|
| WO | 2019018085 A1 | 1/2019 |
| WO | 2019018086 A1 | 1/2019 |

OTHER PUBLICATIONS

Barnhart et al, A low cost femtosatellite to enable distributed space missions, Acta Astronautica, 64, 1123-1143 (Year: 2009).*
Fisher, Diane, et al., "Launch a Frisbee into Orbit", The Technology Teacher, Apr. 2003, International Technology Education Association.

* cited by examiner

*Primary Examiner* — Medhat Badawi
*Assistant Examiner* — Vicente Rodriguez
(74) *Attorney, Agent, or Firm* — LeonardPatel PC

(57) ABSTRACT

An apparatus includes a satellite in the form of a plate having a thickness being smaller than a width of the satellite. The apparatus also includes a plurality of contact points distributed on a face of the satellite, allowing for one or more additional satellites to be stacked upon the satellite.

21 Claims, 35 Drawing Sheets

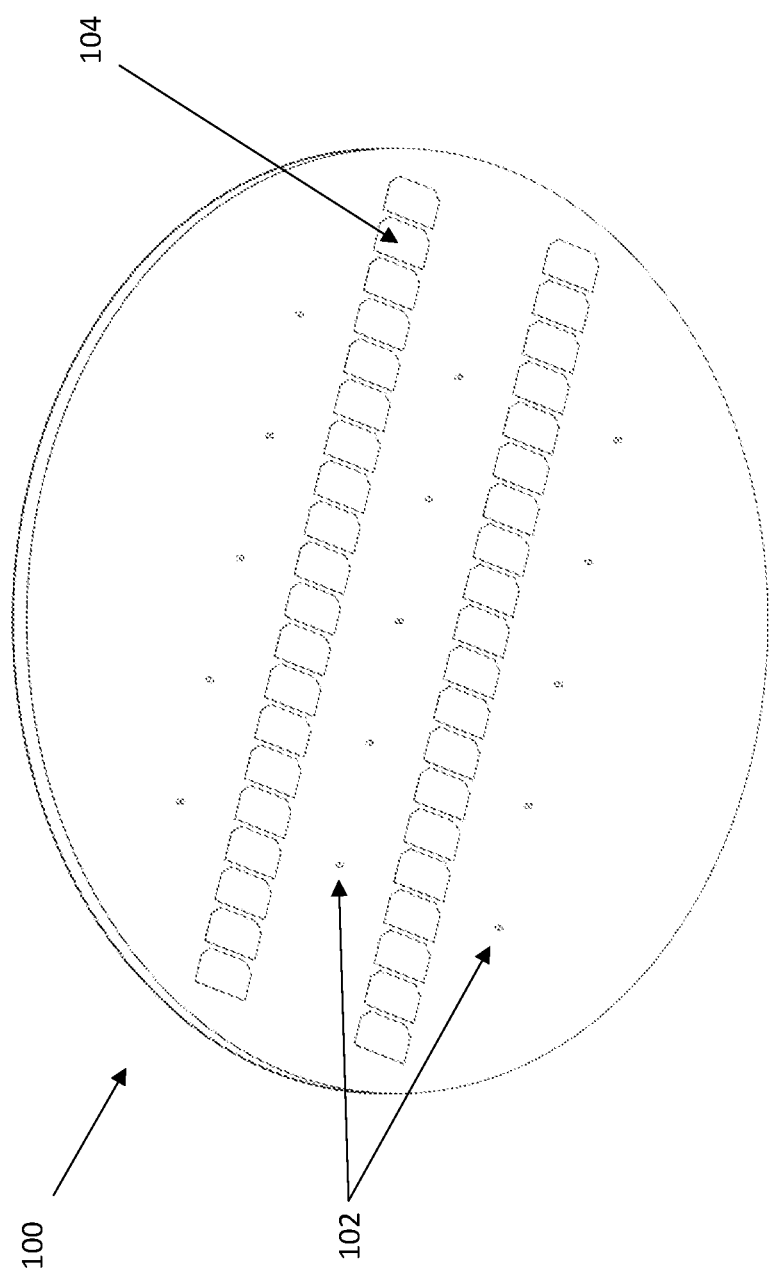

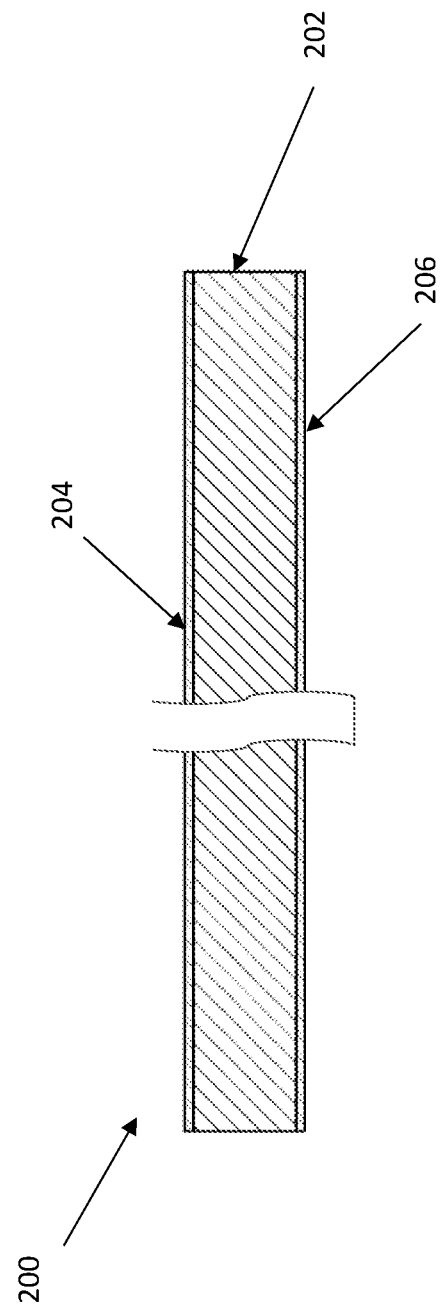

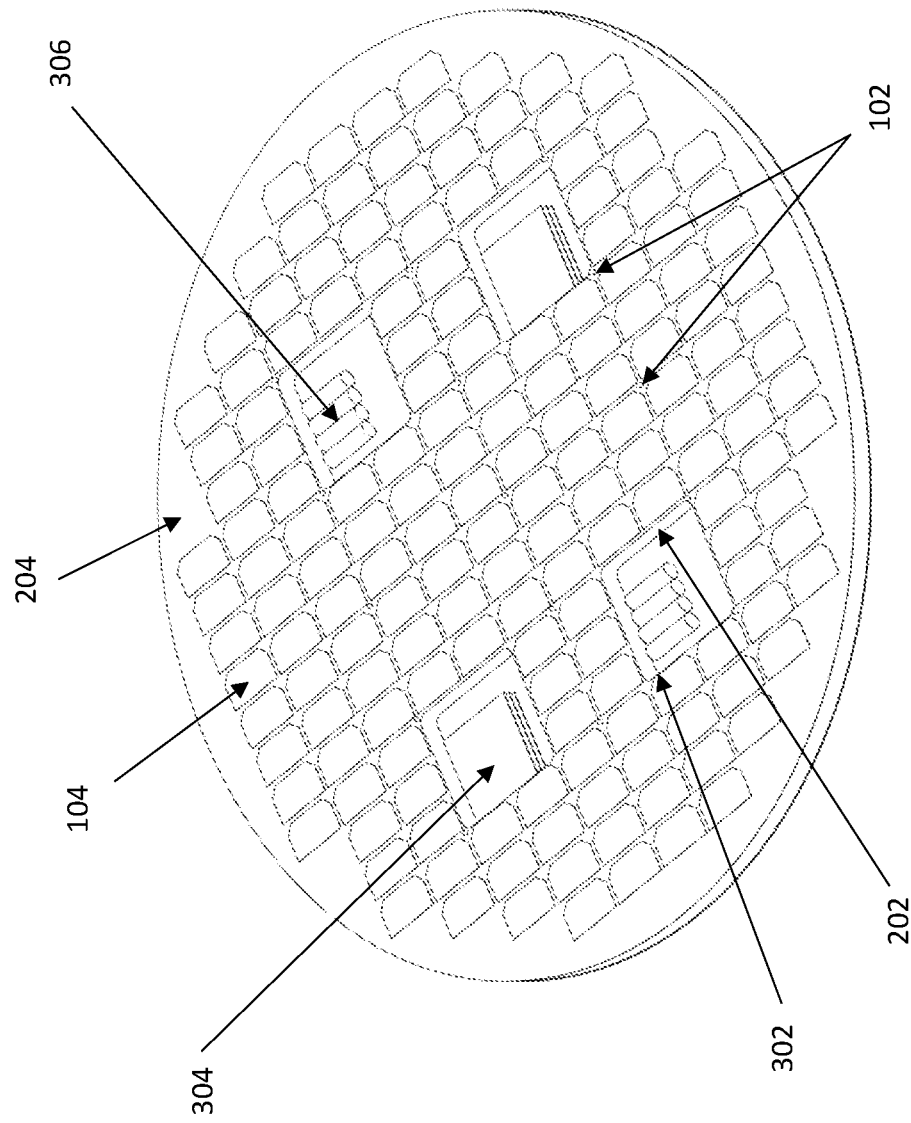

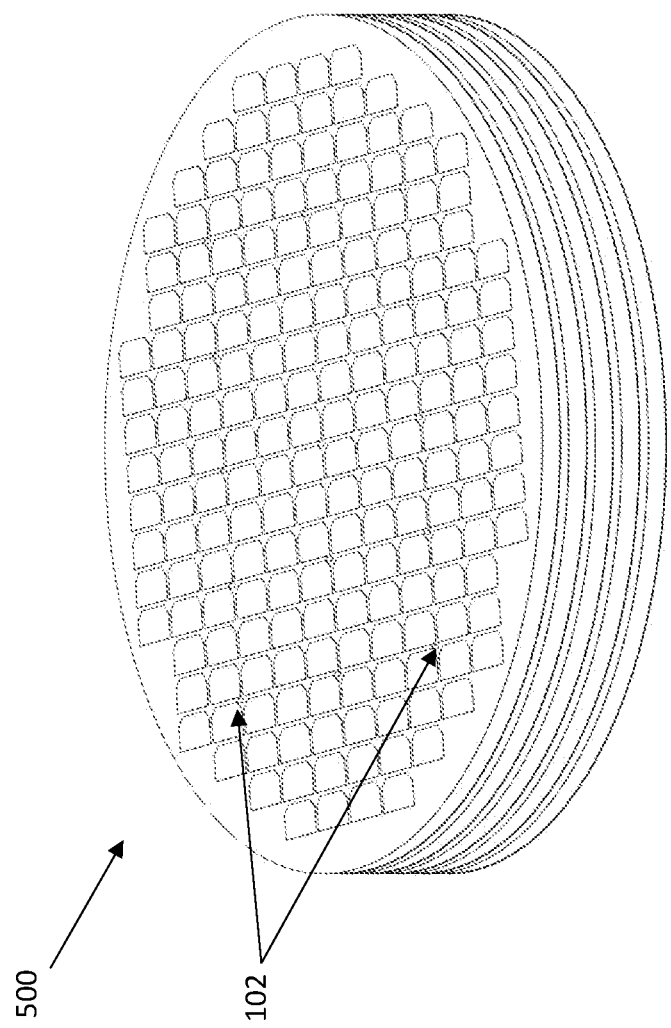

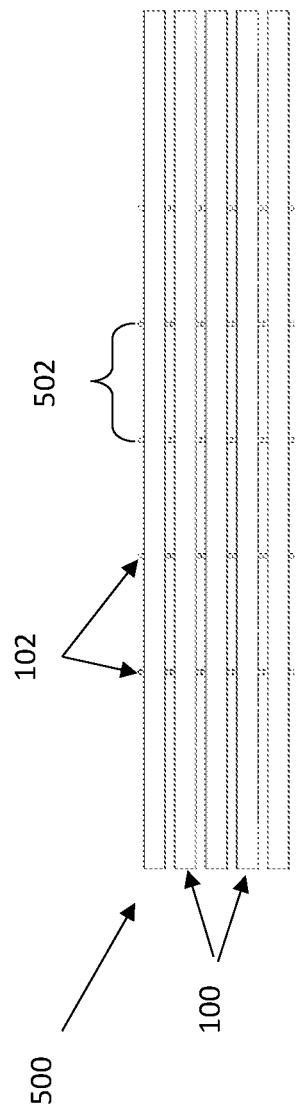

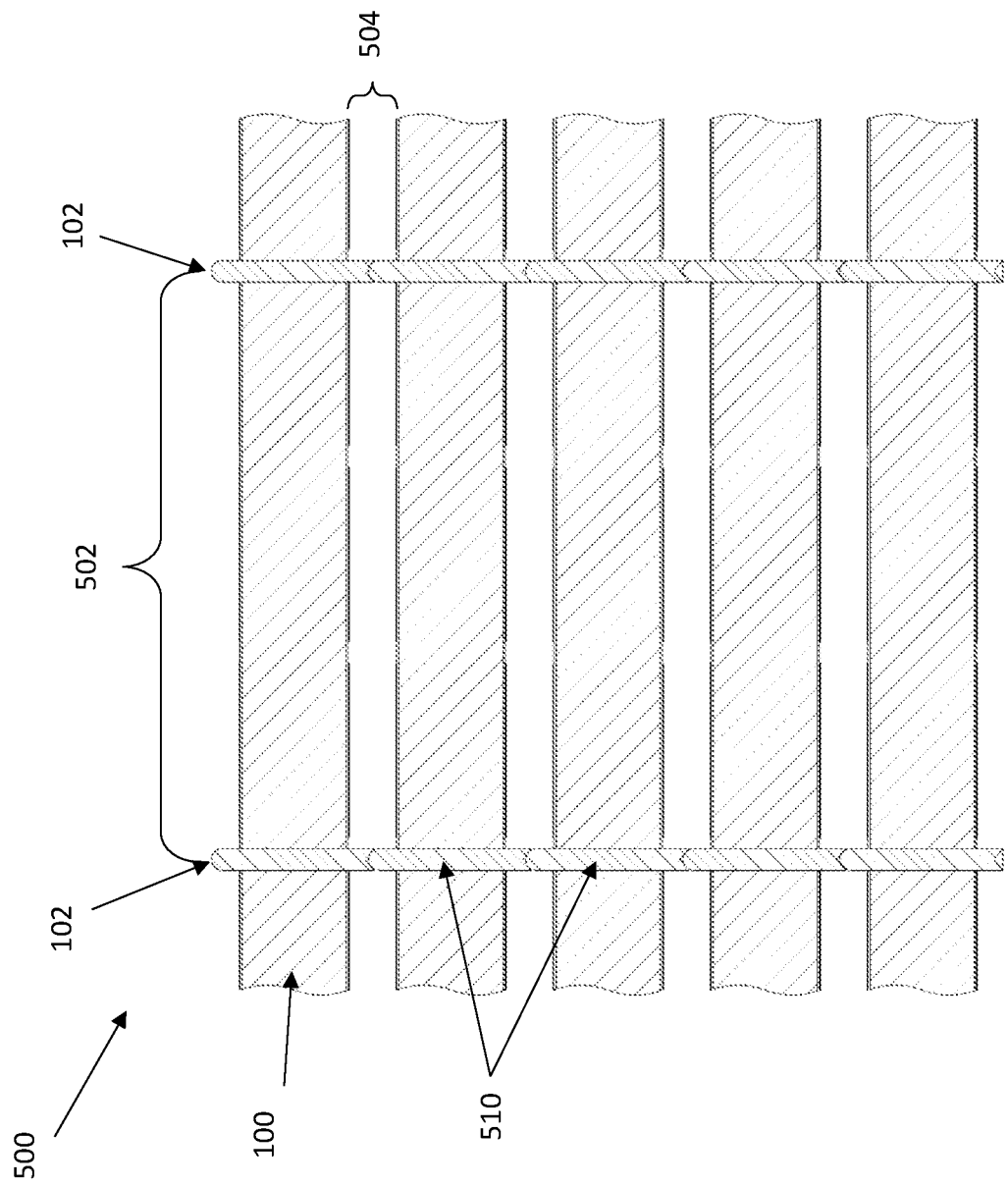

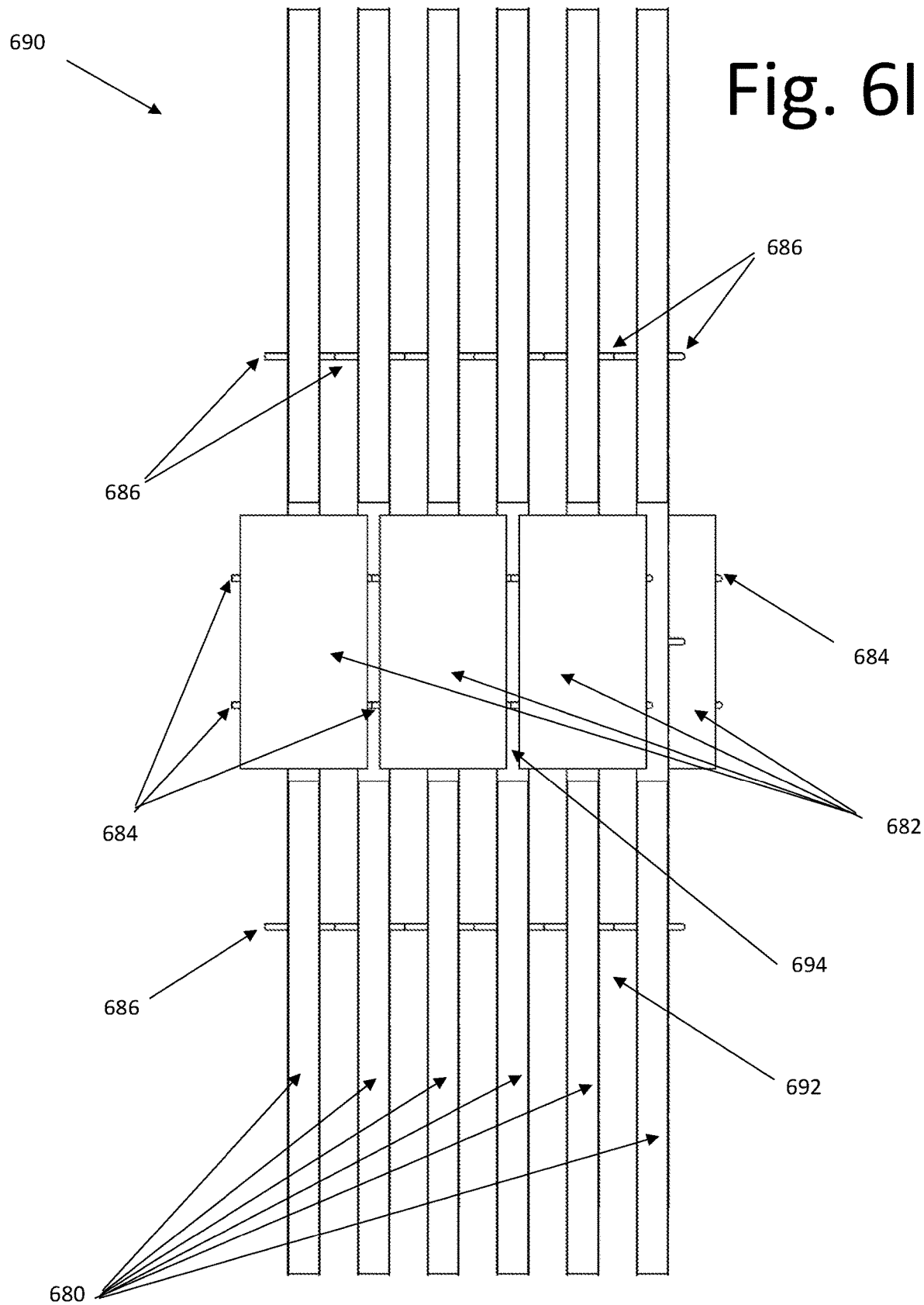

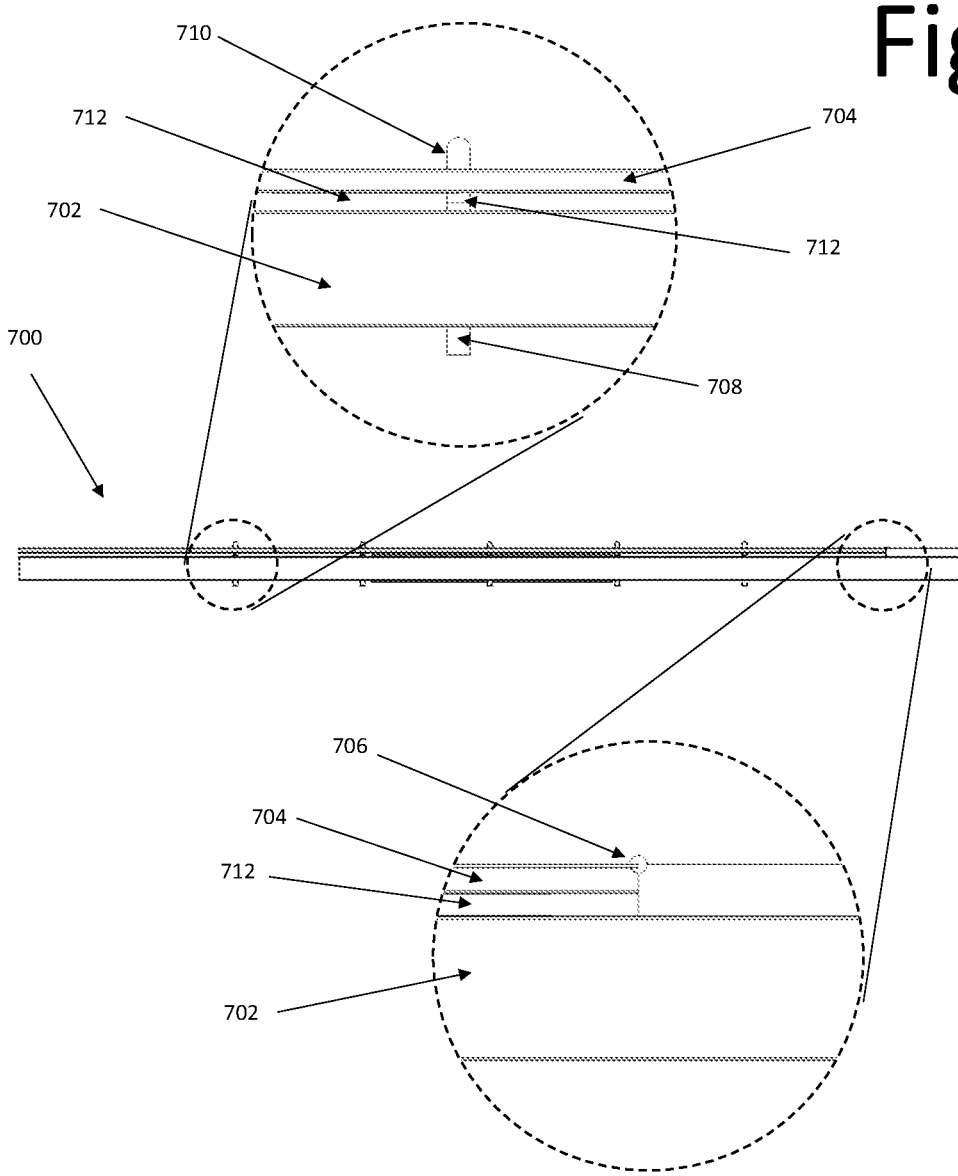

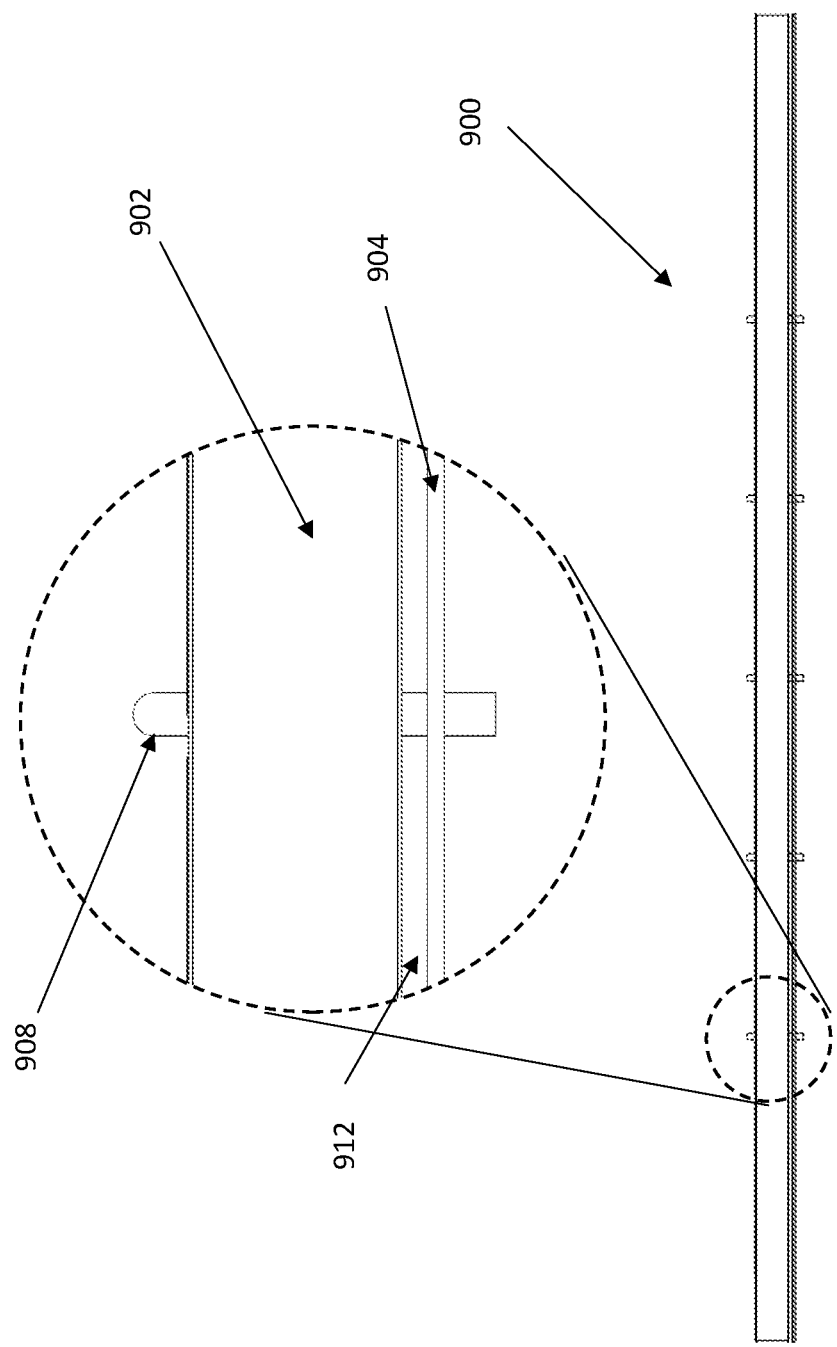

Fig. 10C
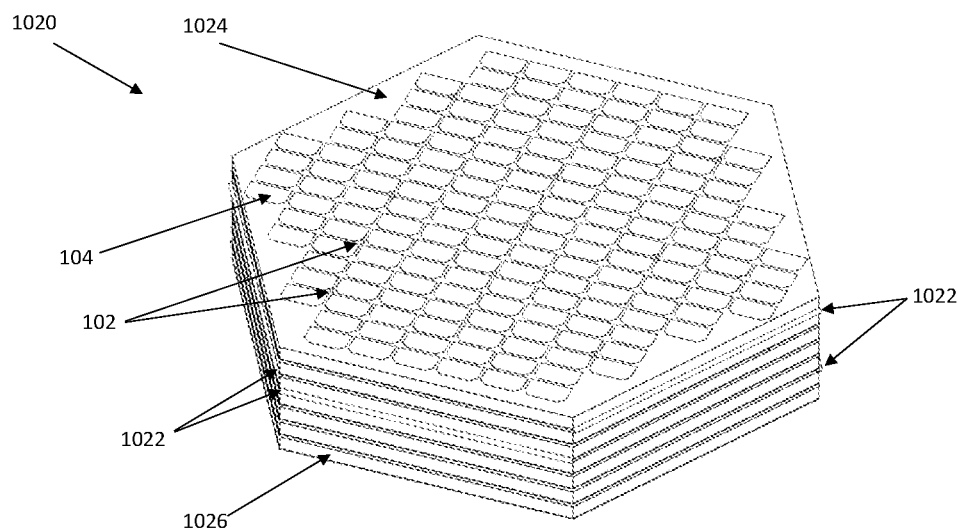
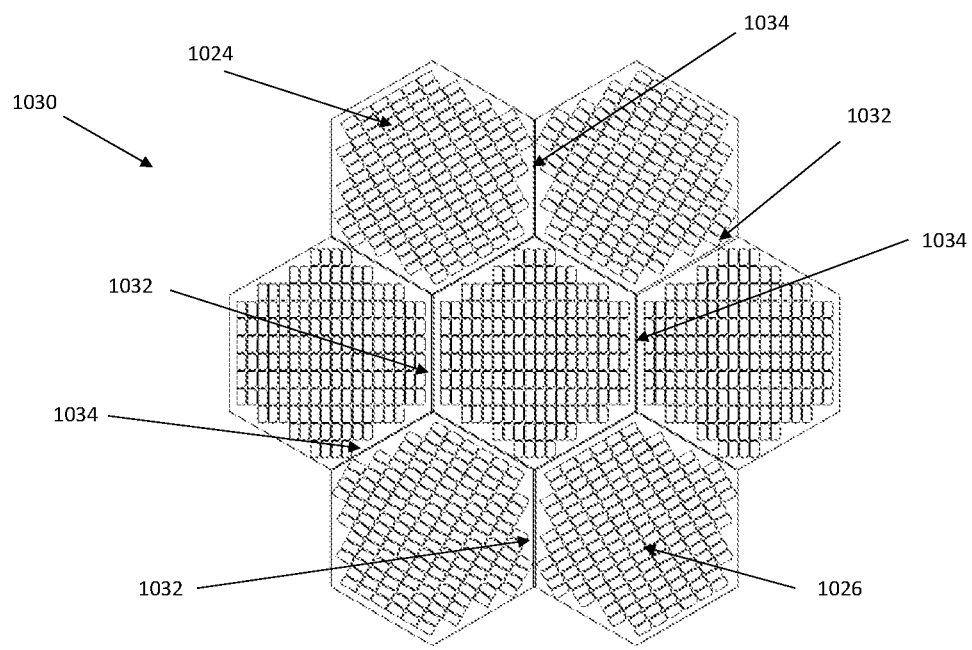
Fig. 10D

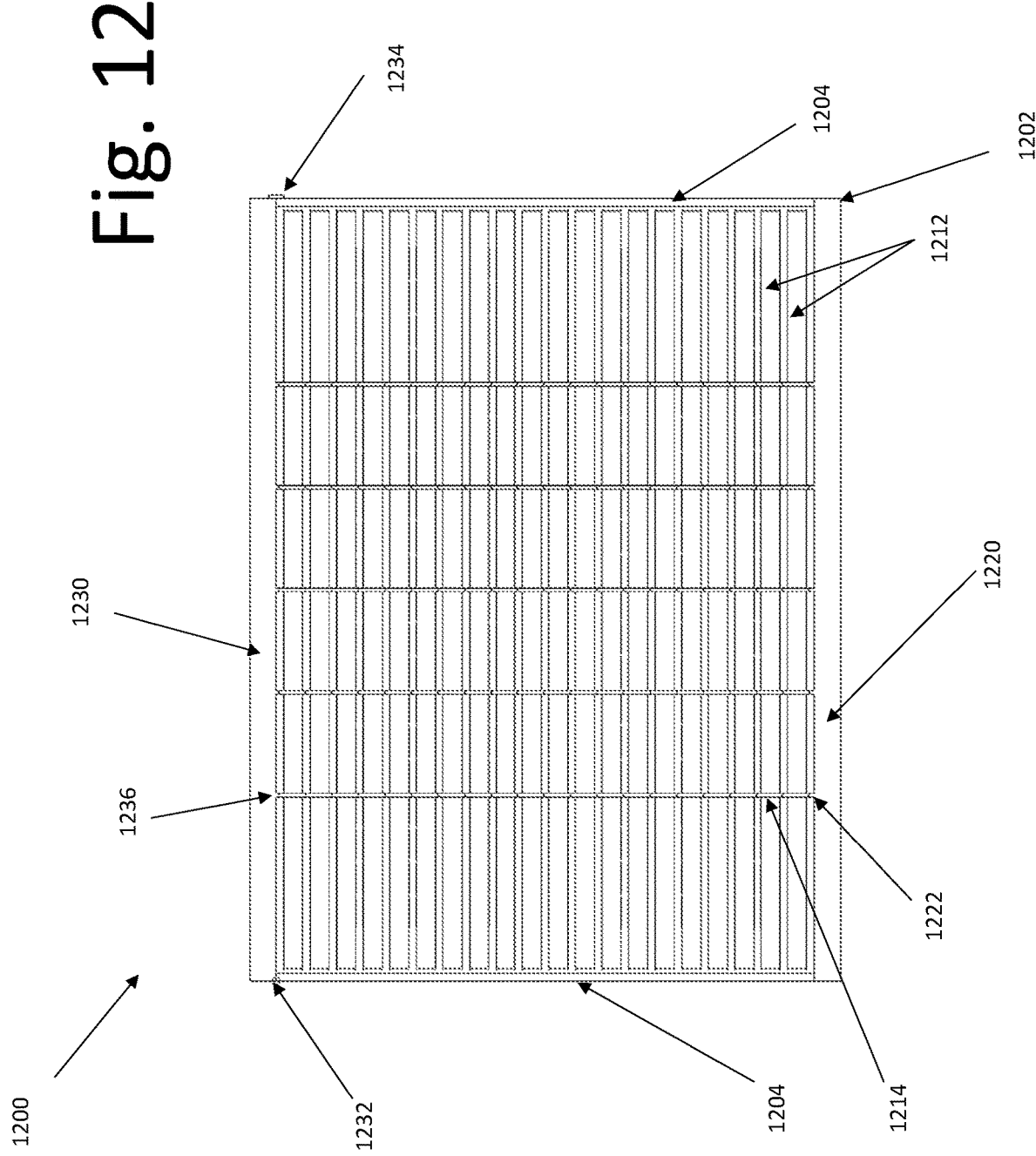

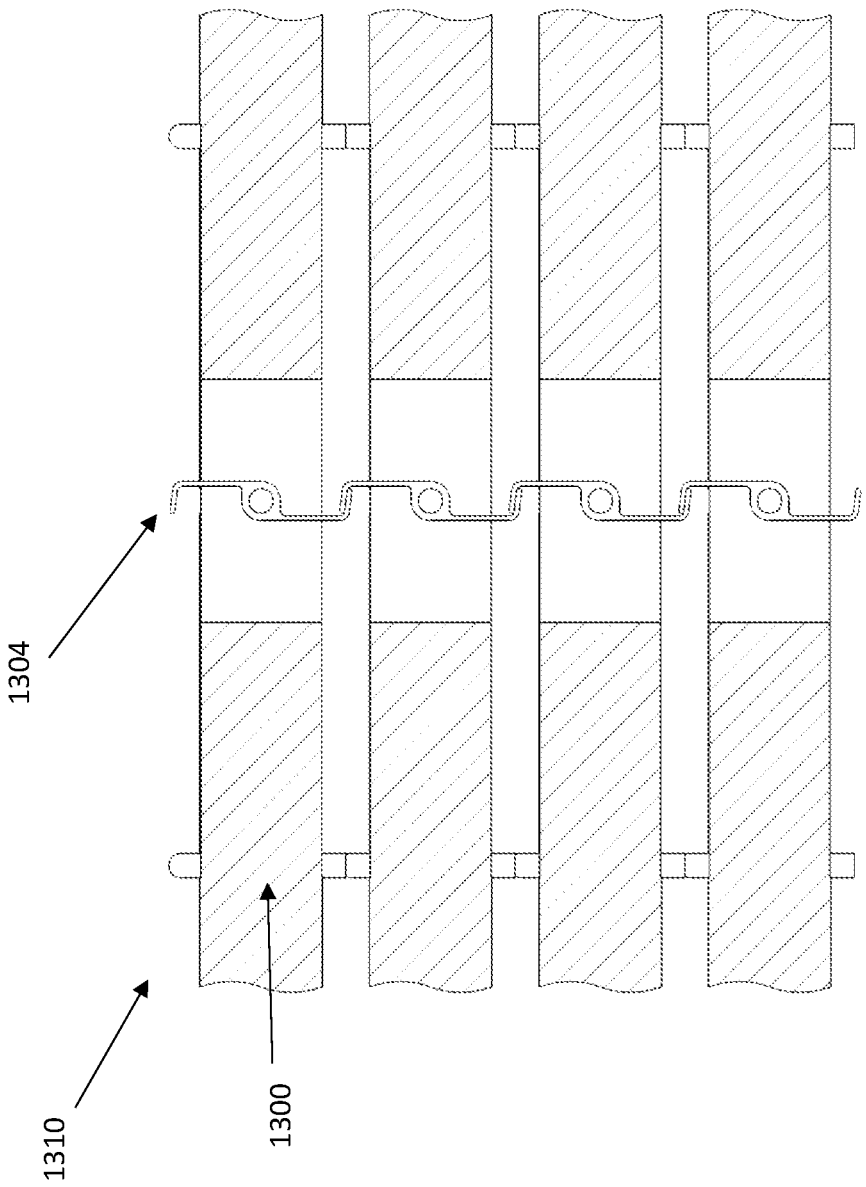

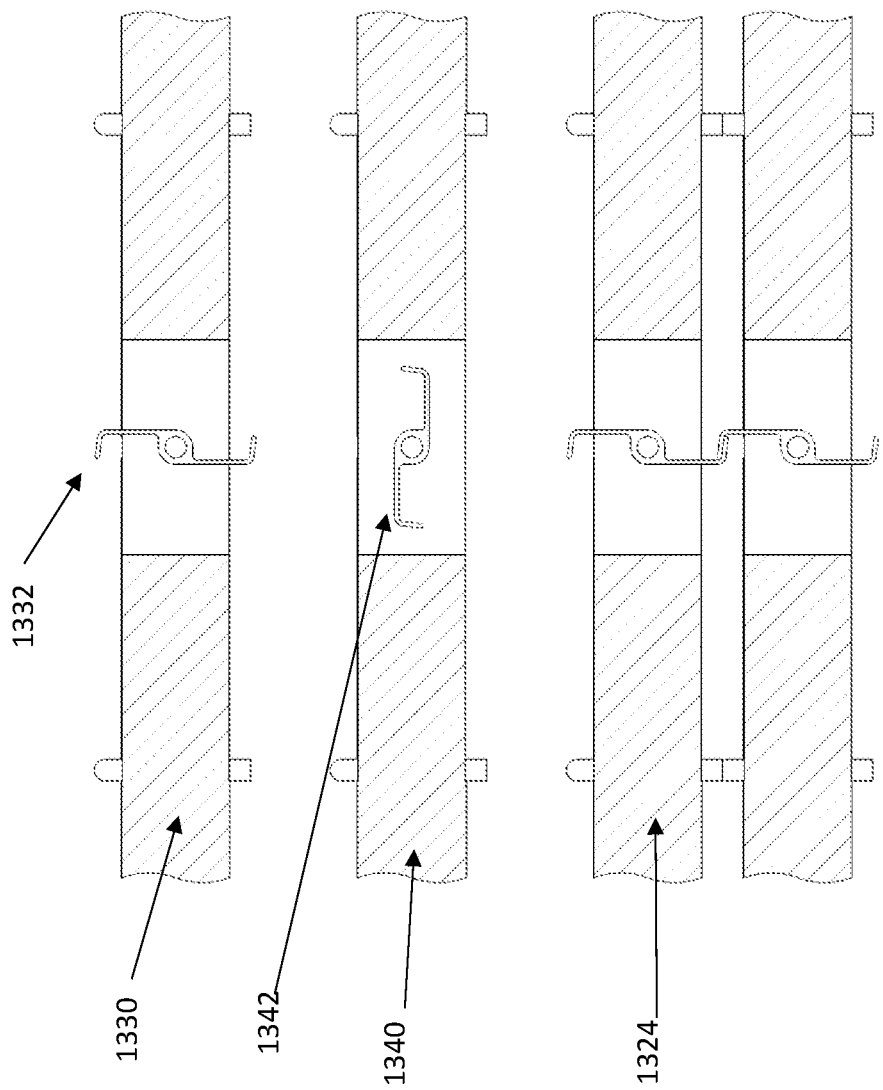

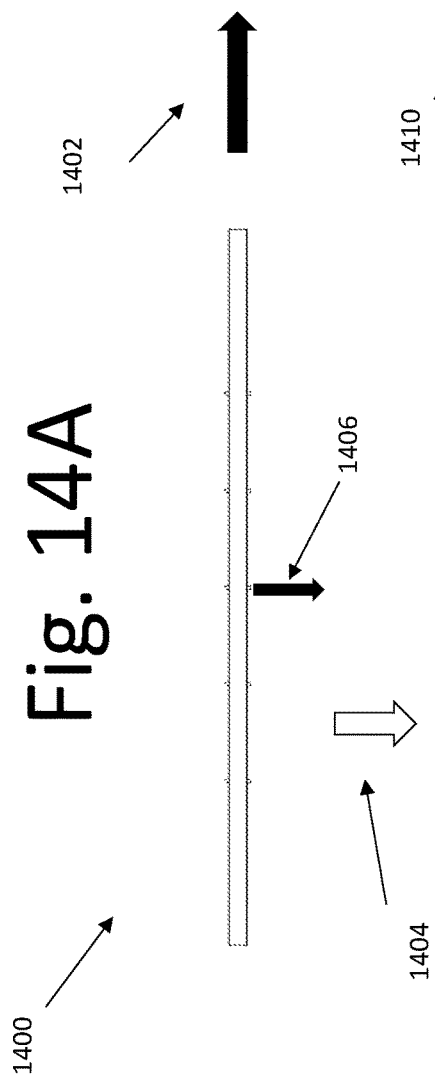
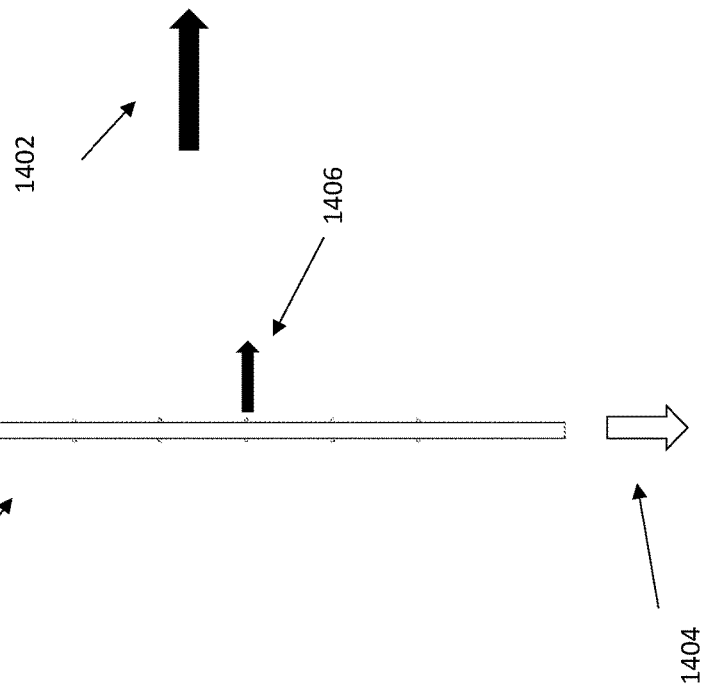

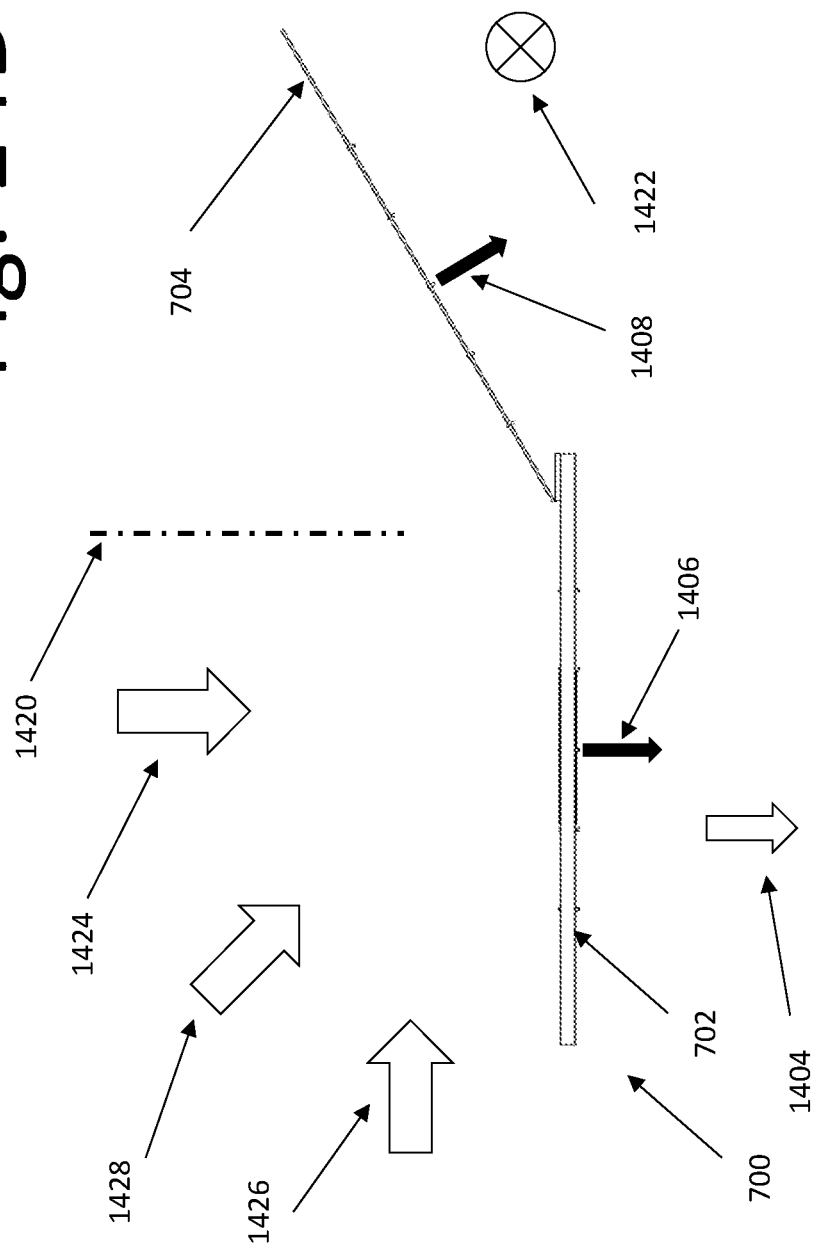

STACKABLE SATELLITE STRUCTURE AND DEPLOYMENT METHOD

STATEMENT OF GOVERNMENT INTEREST

This invention was made with government support under Contract No. FA8802-19-C-0001. The government has certain rights in the invention.

FIELD

The present invention relates to satellites, and more particularly, to structures and methods for stacking satellites in a payload volume and for deploying the stackable satellites.

BACKGROUND

The Cube Sat concept was developed to encourage direct student involvement in space systems by creating a standard that allowed satellites to be launched at an affordable price. The standard was specifically driven by a need to simplify and standardize the interface with launch vehicles, making it both possible and economically feasible for launch providers to carry secondary (rideshare) payloads while minimizing risk to the launch vehicle and primary payload. The initial concept envisioned a satellite in the shape of a 10-cm cube that was designed to be ejected by spring force from a standard box when the lid was opened. The 10-cm cubic shape came to be known as a one-unit (1 U) CubeSat. Deployers were often designed to carry three 1 U CubeSats, and it quickly became the norm to build single satellites that filled these deployers: these became known as 3 U CubeSats, with a volume essentially equal to three stacked 1 U CubeSats. Larger satellites have been designed (and flown) based on various combinations of stacked 1 U CubeSats (or fractions thereof). The CubeSat standard has been very successful in encouraging student projects and a significant number of student satellites have flown in the twenty years since the standard was developed. Not anticipated at the time the CubeSat concept was developed was the potential commercial value of a low-cost standard ride to space. Since then, however, several commercial ventures have been successful in developing and deploying constellations of satellites designed according to the CubeSat standard.

To date, nearly all CubeSats, which typically have a mass between 1 and 10 kg, have been launched as rideshare payloads on launch vehicles designed for much larger payloads. For example, most US domestic space launches take place on Atlas, Delta, Antares, or Falcon launch vehicles, all of which have launch capacities to low Earth orbit (LEO) in excess of 5000 kg. With that payload capacity, there is no practical mission application that would fill an entire launch vehicle with CubeSats or CubeSat-class spacecraft. However, it is often the case that a primary payload does not require the full payload capacity of the launch vehicle, so there is often room for rideshare payloads.

There are a number of satellite constellations either proposed or currently under development that involve thousands of satellites, enough to fill the payload capacity of any existing launch vehicle even if the satellites can be reduced in mass to a few kg each. However, all of these constellations require that the satellites be deployed across various orbital planes. Since it is challenging for multiple satellites launched on a single launch vehicle to be deployed in more than one orbital plane, the number of launches required to deploy a constellation typically will not be substantially fewer than the number of orbital planes in the constellation. Although multiple planes are often involved, space system architectures based on distributed swarms, clusters, or constellations may also require multiple satellites delivered to the same orbit (specifically a single orbital plane). In general, the overall architecture of a typical satellite constellation will involve multiple orbital planes with multiple satellites in each plane. In contrast to the challenge of deploying satellites over multiple planes from a single launch vehicle, however, it is relatively easy to distribute multiple satellites around a single orbital plane when all are launched together on a single launch vehicle. If the number of satellites that can be used in a single orbital plane is large enough to fill the payload capacity of an entire launch vehicle, then it may make sense for a satellite operator to purchase entire launch vehicles instead of going as rideshare payloads. As such, the key metric in determining the compatibility of a launch vehicle and constellation design is the comparison of the payload capacity and the combined mass of all satellites in a single orbital plane. For example, a constellation that uses 25 satellites per plane, with each satellite having a mass of 200 kg, will require 5000 kg delivered to each orbital plane. Such a constellation could make efficient use of a launch vehicle with 5000 kg capacity. On the other hand, a constellation that uses 50 satellites per plane, where each satellite is only 5 kg, would require only 250 kg per plane, and would not be able to justify using a typical large launch vehicle.

To support the growing importance of smaller satellites, recent trends in the space-launch industry have included development of a number of smaller launch vehicles designed (and appropriately priced) to carry payloads between 200 and 1000 kg to LEO. The Rocket Lab Electron, for example, which recently entered service and has completed several successful launches, is designed for a nominal payload to LEO of 225 kg. Thus, a satellite constellation that requires delivery of payloads of this magnitude to each orbital plane can make economical use of this new small launch vehicle without requiring rideshare. For at least one Electron launch, in December 2018, the payload consisted entirely of 13 CubeSats. Assuming 3-unit (3 U) CubeSats, which are typically limited to 5 kg, the Electron would be mass limited to carry about 45 satellites. In practice, however, the CubeSat deployer adds a mass penalty of up to a few kg per satellite, and the volume constraints of the payload fairing make it difficult to carry more than about 20 3 U deployers. As such, it is not clear that satellites conforming to the CubeSat standard can take advantage of the full payload mass capacity of the Electron.

If rideshare is not a primary driver of satellite architecture, and satellites conforming to the CubeSat standard are not able to take full advantage of the new smaller launch vehicles, then the benefit of conforming with the CubeSat standard becomes less clear. Alternative satellite configurations can be considered, limited only by the mass and volume capacity of the launch vehicle.

Satellites designed to the CubeSat standard are strictly volume limited; they must fit within the available CubeSat deployers. Most CubeSat launch services are priced on a per-unit basis (with one unit being a CubeSat unit with approximately one liter of volume) meaning that there is an incentive to squeeze as much capacity as possible into a small volume. While there are also mass limitations, these tend to be less restrictive both because they are relatively high to begin with (typically at least 1.3 kg per unit) and are often negotiable to higher values. If the structural mass of the CubeSat is not excessive, it can be challenging to fill a CubeSat with useful components at a density as high as 1.3 kg per unit.

In contrast to the volume limitation of the CubeSat standard, launch vehicles are typically classed according to how much mass they can deliver to orbit. While there are volume limitations (defined by the payload fairing), they are typically far less restrictive than the mass limitations. Considering again the Rocket Lab Electron for illustration: The nominal payload to LEO is 225 kg. The volume within the payload fairing comprises a cylindrical section just over 1 m in diameter and 56 cm high, and a tapered section that brings the total height to just under 2 m. The total usable payload volume is about 1.2 cubic meters. If a spacecraft were to take full advantage of this volume while remaining within the mass limit of the Electron, it would have an average density under 200 kg/m3, or, in CubeSat terminology, 200 g per unit, which is only about 15% of the mass limit imposed by the CubeSat standard.

In missions aimed at radio-frequency (RF) systems, either the transmit or receive functions (or both) may benefit by having large aperture areas for deployment of phased arrays or other antennas. However, large apertures can be challenging in satellites conforming to the CubeSat standard. For example, a typical 3 U CubeSat will have as its largest face a rectangle of about 10 by 34 cm. A 6 U CubeSat can stretch this to about 22 by 34 cm. Regardless of CubeSat size, of course, the maximum face size can be extended with deployable surfaces. However, this adds a degree of complexity, particularly if the deployable surface requires multiple panels and there are associated flatness or orientation requirements.

Similarly, many RF missions that involve transmissions to the Earth's surface can require more power than is available from body-mounted solar cells, leading to a requirement for deployable solar collectors.

Accordingly, an improved combination of satellite and deployer designs to support combined launches of multiple small satellites may be beneficial.

SUMMARY

Certain embodiments of the present invention may provide solutions to the problems and needs in the art that have not yet been fully identified, appreciated, or solved by current satellite and deployment technologies. For example, some embodiments of the present invention pertain to an improved combination of satellite and deployer to support combined launches of multiple small satellites.

In an embodiment, apparatus includes a satellite in the form of a plate having a thickness being smaller than a width of the satellite. The apparatus also includes a plurality of contact points distributed on a face of the satellite, allowing for one or more additional satellites to be stacked upon the satellite.

In another embodiment, an apparatus includes a satellite in the form of a plate having a thickness being smaller than a width of the satellite. The apparatus also includes a plurality of contact points distributed on a face of the satellite, allowing for one or more additional satellites to be stacked upon the satellite. The plate is fabricated from a sandwich panel comprising two face sheets bonded to a core material, the core material being situated between the face sheets.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A and 1B are diagrams illustrating a satellite from top and bottom perspective views, respectively, according to an embodiment of the present invention.

FIG. 2 is a diagram illustrating a structure of the plate, according to an embodiment of the present invention.

FIG. 3 is a diagram illustrating placement of non-structural satellite components within cavities in the satellite core material, according to an embodiment of the present invention.

FIG. 5A illustrates a perspective view of a stack of five satellites, according to an embodiment of the present invention.

FIG. 5B illustrates a side view of a stack of satellites showing the alignment of contact points between satellites in the stack, according to an embodiment of the present invention.

FIG. 5D is a diagram illustrating partial cross section of a stack of five satellites, according to an embodiment of the present invention.

6G-I is are diagrams illustrating a satellite incorporating a protruding element that is large enough to displace one or more members of the standard pattern of contact points, according to an embodiment of the present invention.

Figure 7A:
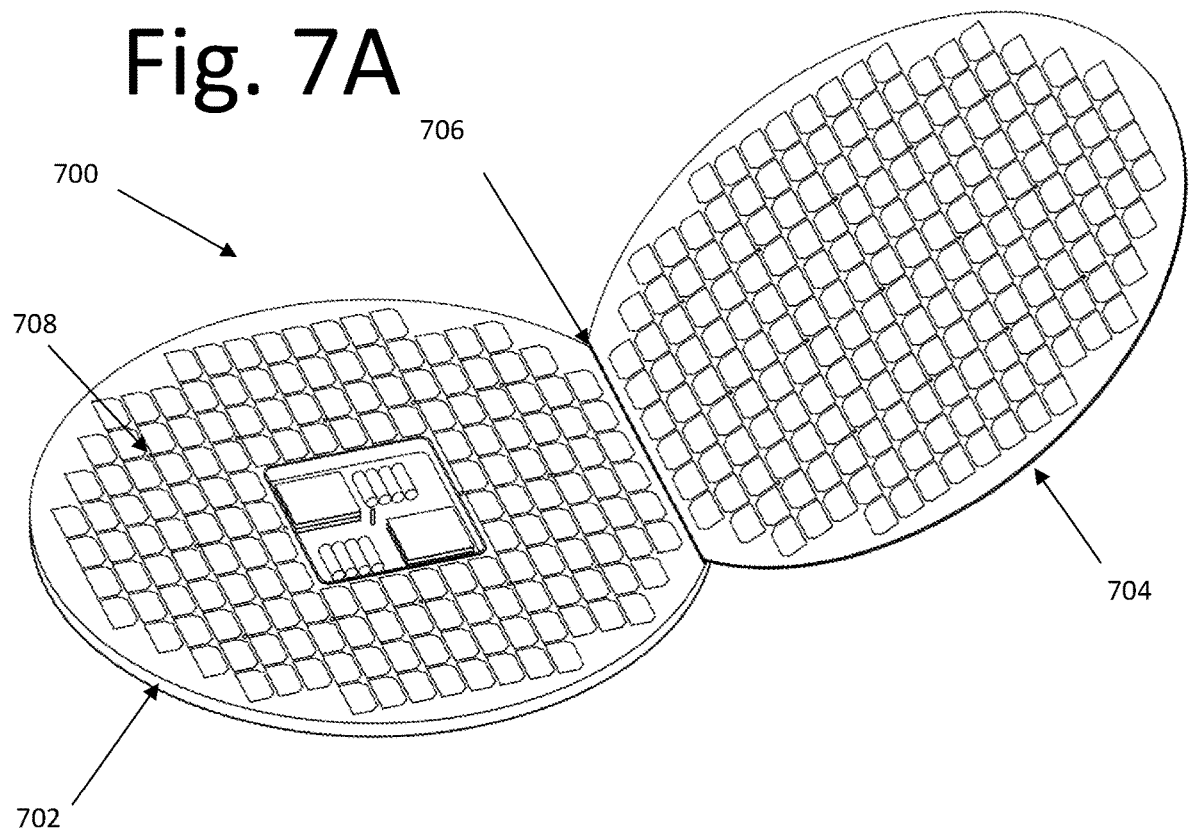
Figure 7B:
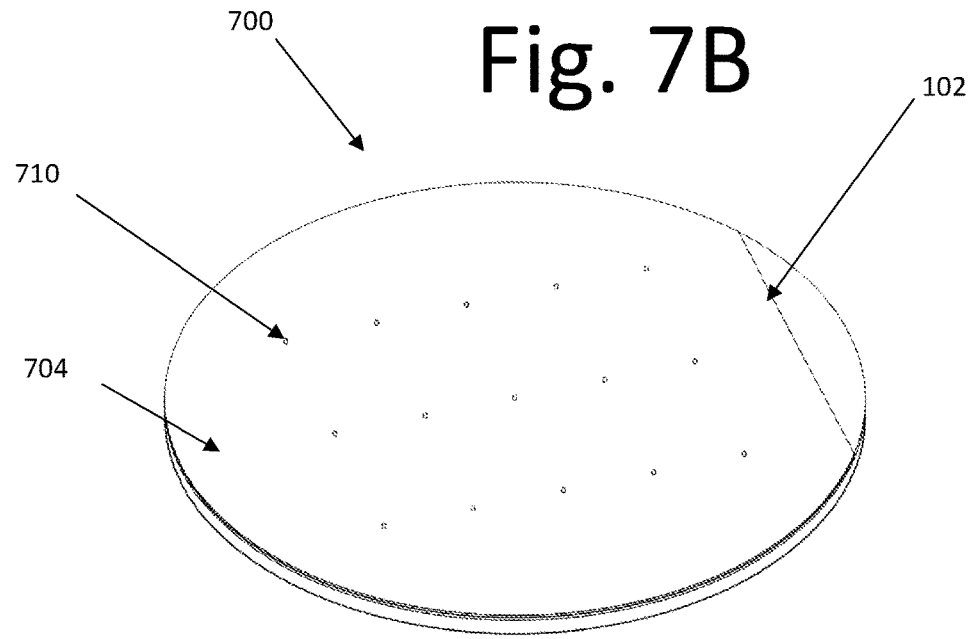

FIGS. 7A and 7B are diagrams illustrating a satellite in the shape of a disk with solar panels and electronics, according to an embodiment of the present invention.

FIG. 8 is a diagram illustrating a side view of satellite with closeup details of the load pins and hinge, according to an embodiment of the present invention.

FIG. 9 is a diagram illustrating a non-deployable stand-off panel for thermal control or isolation of an RF antenna, according to an embodiment of the present invention.

Figure 10A:
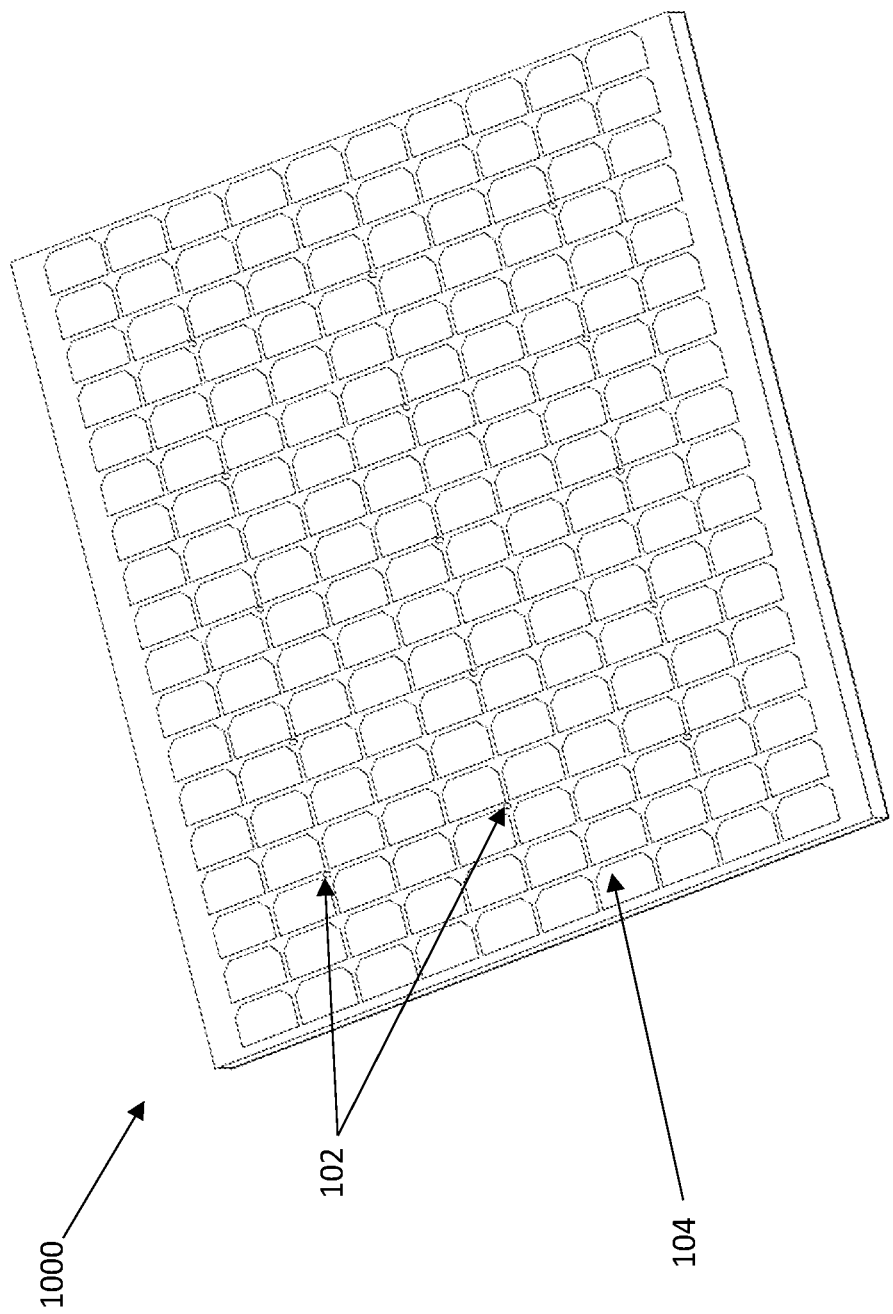

FIG. 10A is a diagram illustrating a square plate satellite shaped to take maximum advantage of the available payload volume on an ESPA port, according to an embodiment of the present invention.

Figure 10B:
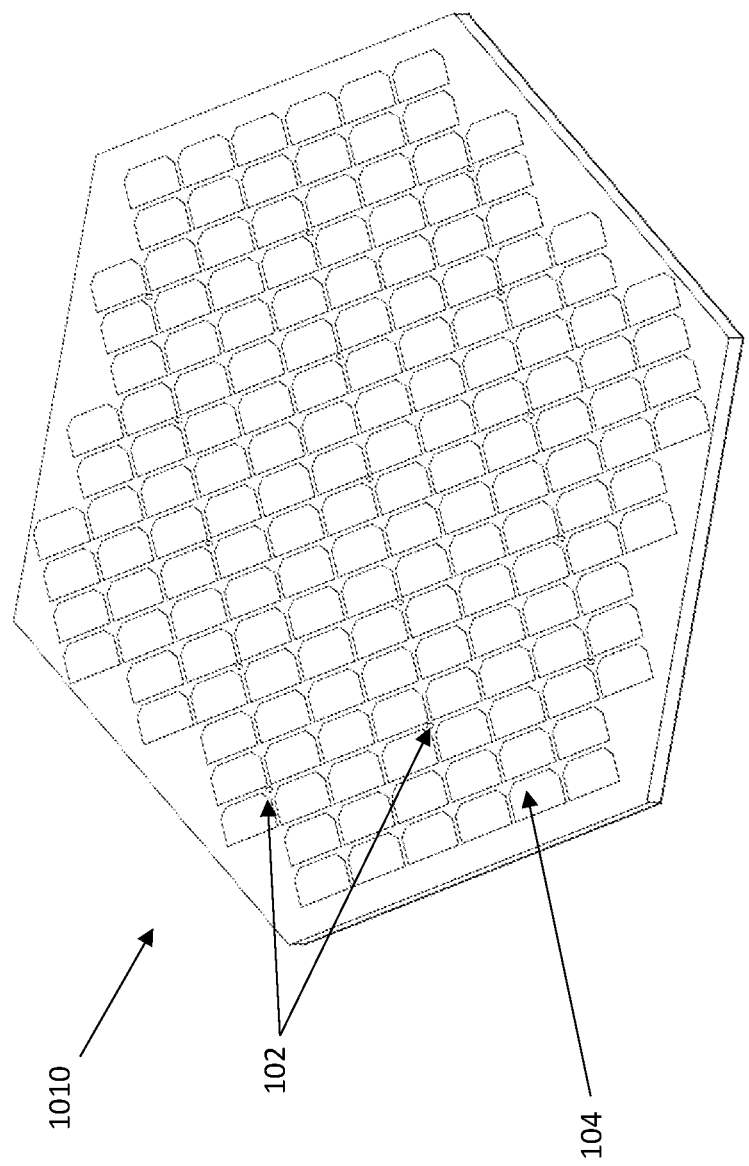

FIG. 10B is a diagram illustrating a flat-plate satellite in the shape of a hexagon, according to an embodiment of the present invention.

FIGS. 10C and 10D are diagrams illustrating a series of consecutive satellite plates arranged in a stack, according to an embodiment of the present invention.

Figure 11A:
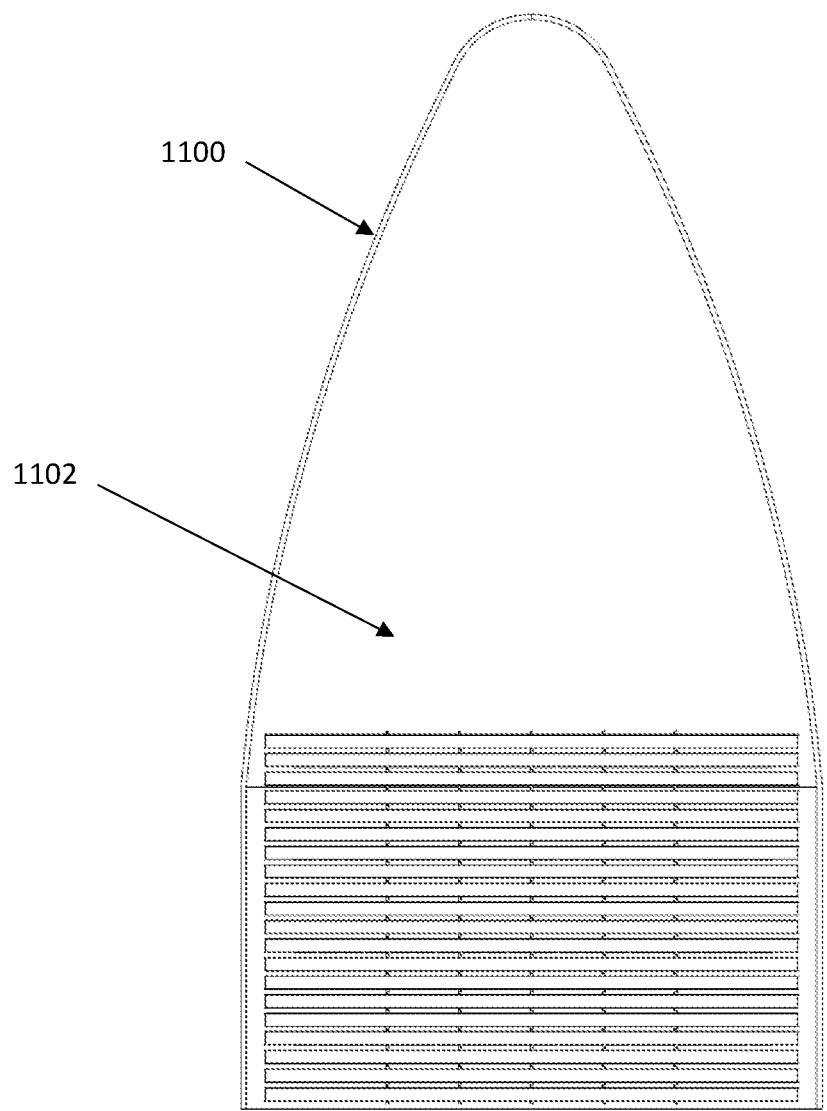

FIG. 11A is a diagram illustrating a launch vehicle payload fairing enclosing a payload volume, according to an embodiment of the present invention.

Figure 11B:
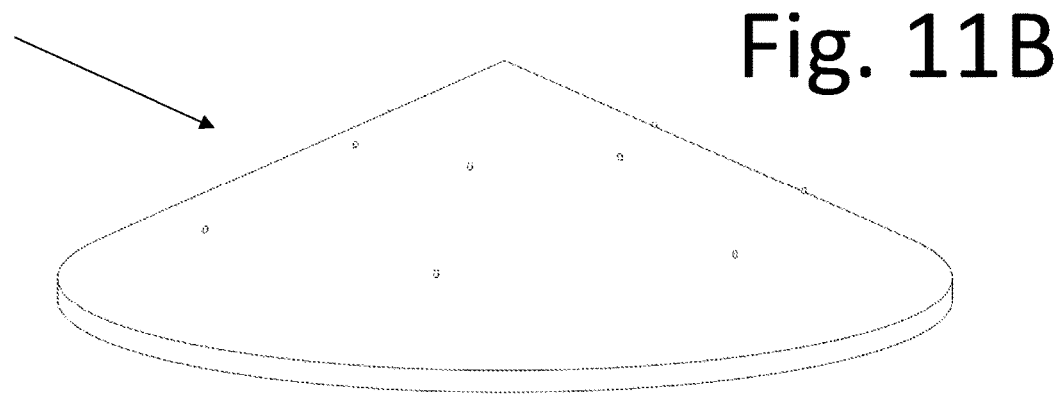

FIG. 11B is a diagram illustrating a satellite in the form of a conical shell, according to an embodiment of the present invention.

Figure 11C:
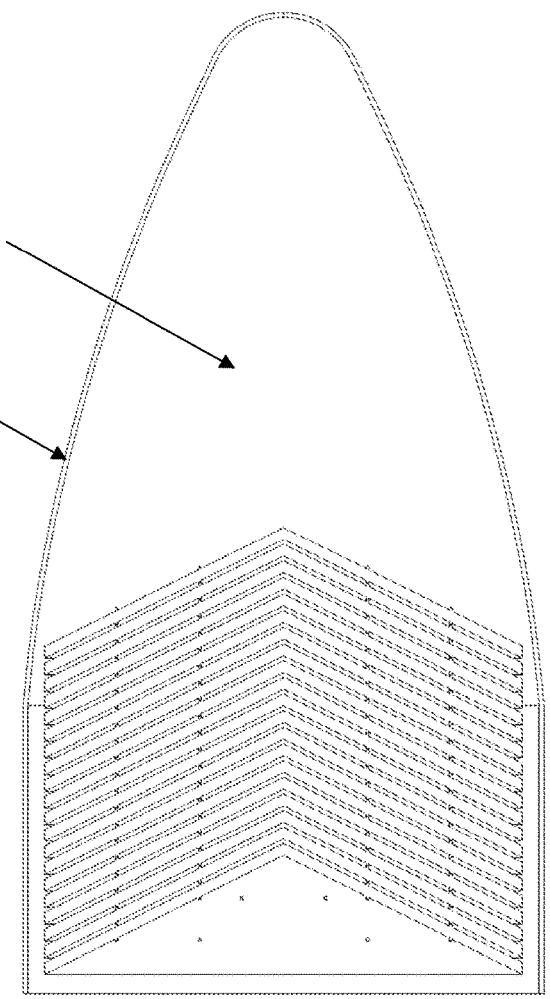

FIG. 11C is a diagram illustrating a cross-section of multiple copies satellites 1104 being stacked, according to an embodiment of the present invention.

FIG. 12 is a diagram illustrating a deployer, according to an embodiment of the present invention.

Figure 13A:
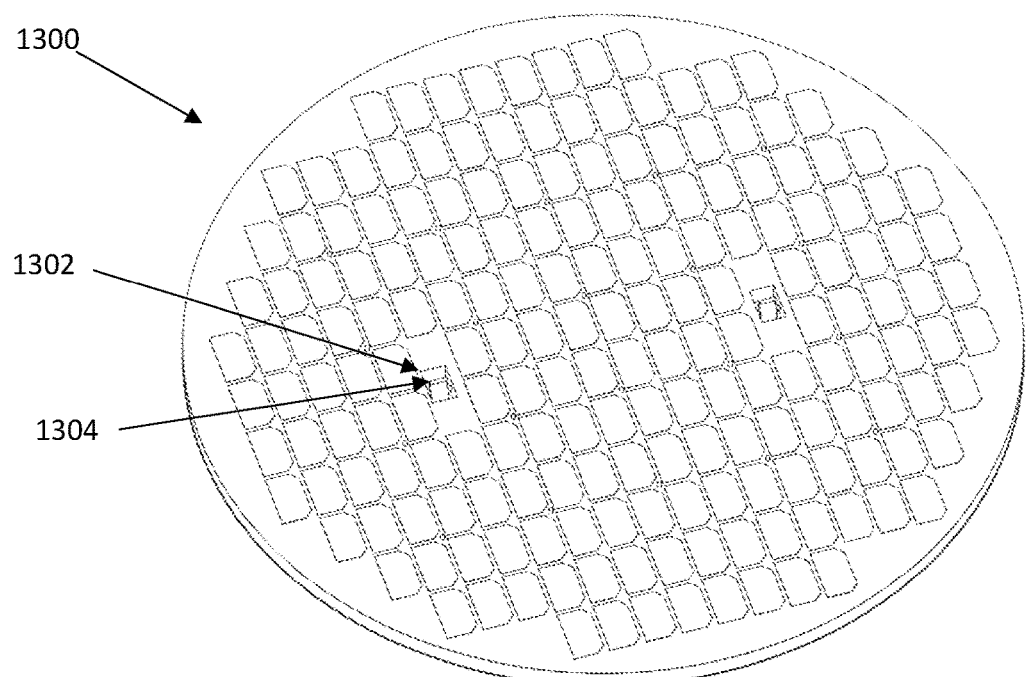
Figure 13B:
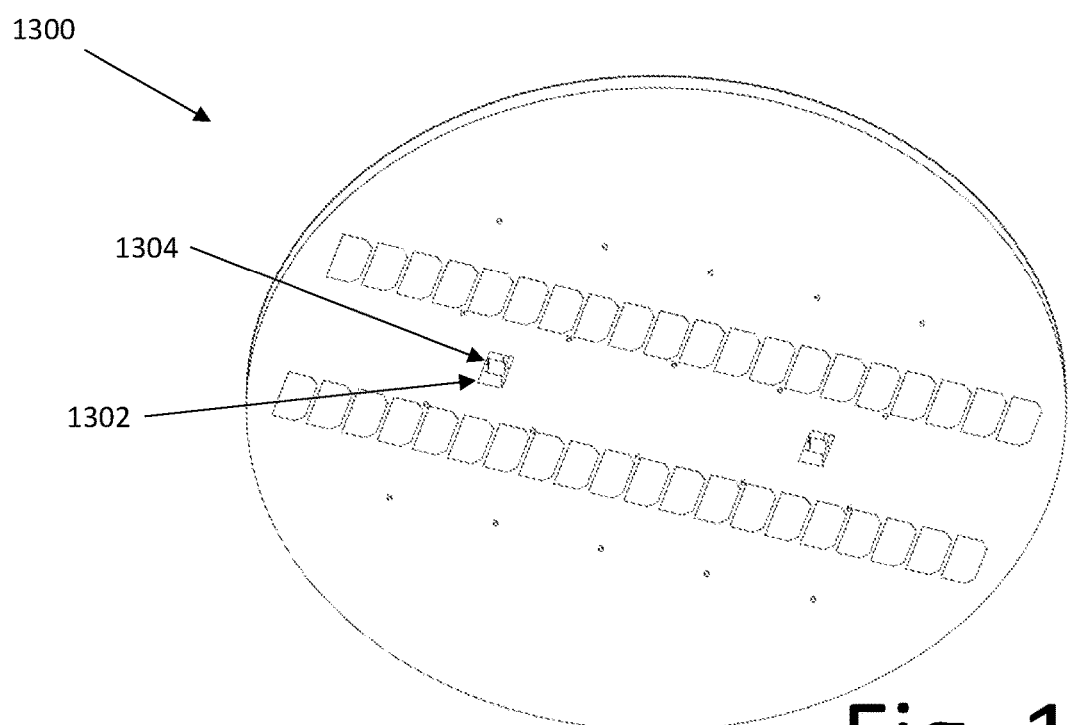

FIGS. 13A and 13B are diagrams illustrating perspective views from the top and bottom, respectively, of a satellite incorporating release mechanisms according to an embodiment of the present invention.

Figure 13C:
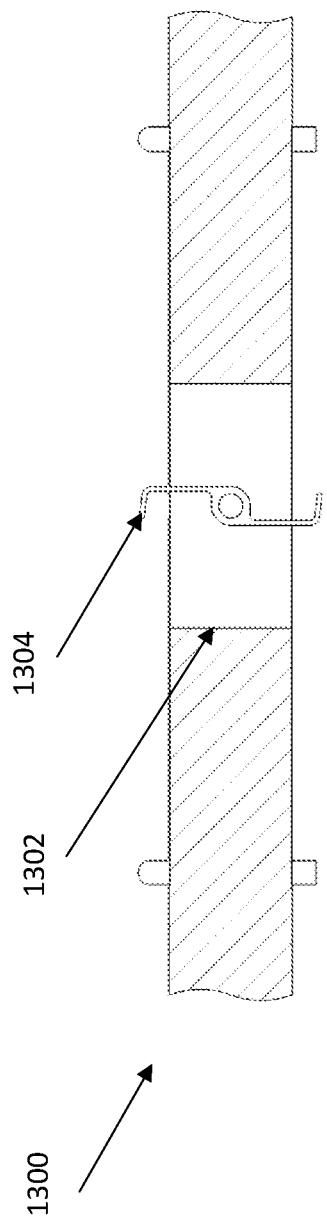
Figure 13D:
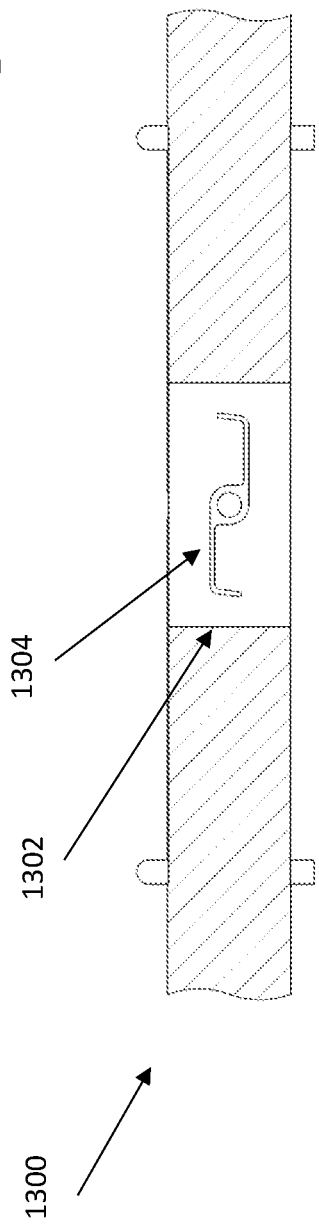

FIGS. 13C and 13D are diagrams illustrating cross sections of a portion of satellite with latch respectively in the closed and open positions, according to an embodiment of the present invention.

FIG. 13E is a diagram illustrating a cross section of a portion of a stack of satellites illustrating the manner in which latches on successive satellites engage with one another, according to an embodiment of the present invention.

Figure 13F:
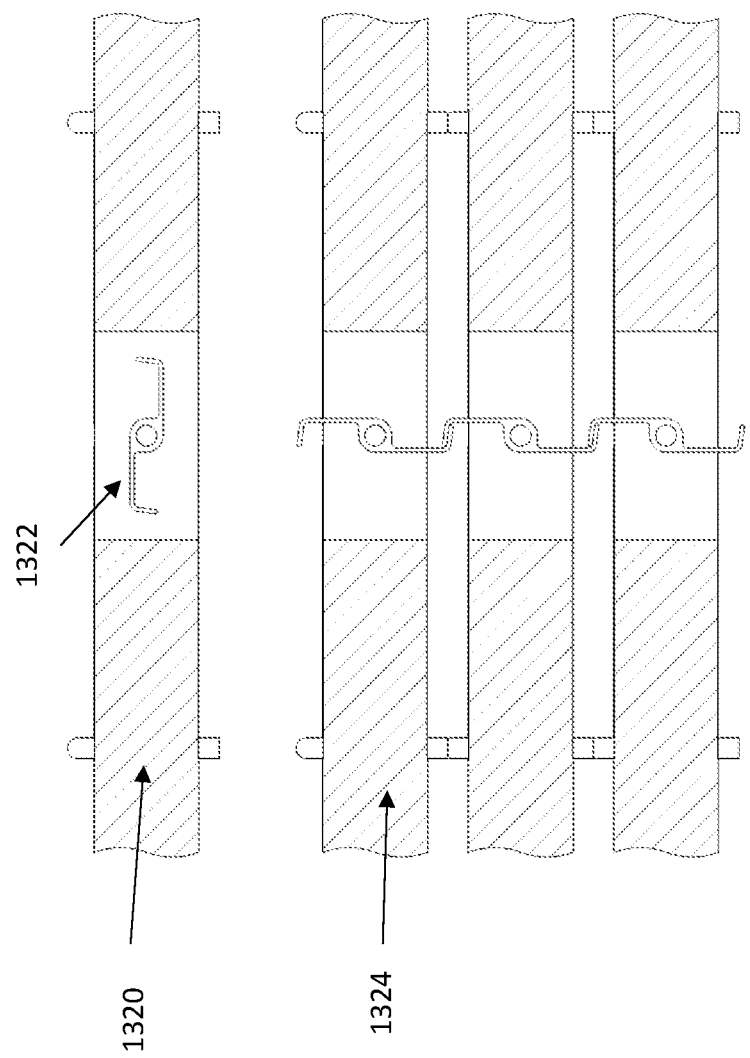

FIG. 13F is a diagram illustrating a normal mode of operation of the latches, according to an embodiment of the invention.

FIG. 13G is a diagram illustrating a mode of operation should one latch fail to operate correctly, according to an embodiment of the present invention.

FIG. 14A is a diagram illustrating a plate satellite in a low-drag orientation, according to an embodiment of the present invention.

FIG. 14B is a diagram illustrating a satellite flown with the plate-normal vector parallel to velocity vector, according to an embodiment of the present invention.

Figure 14C:
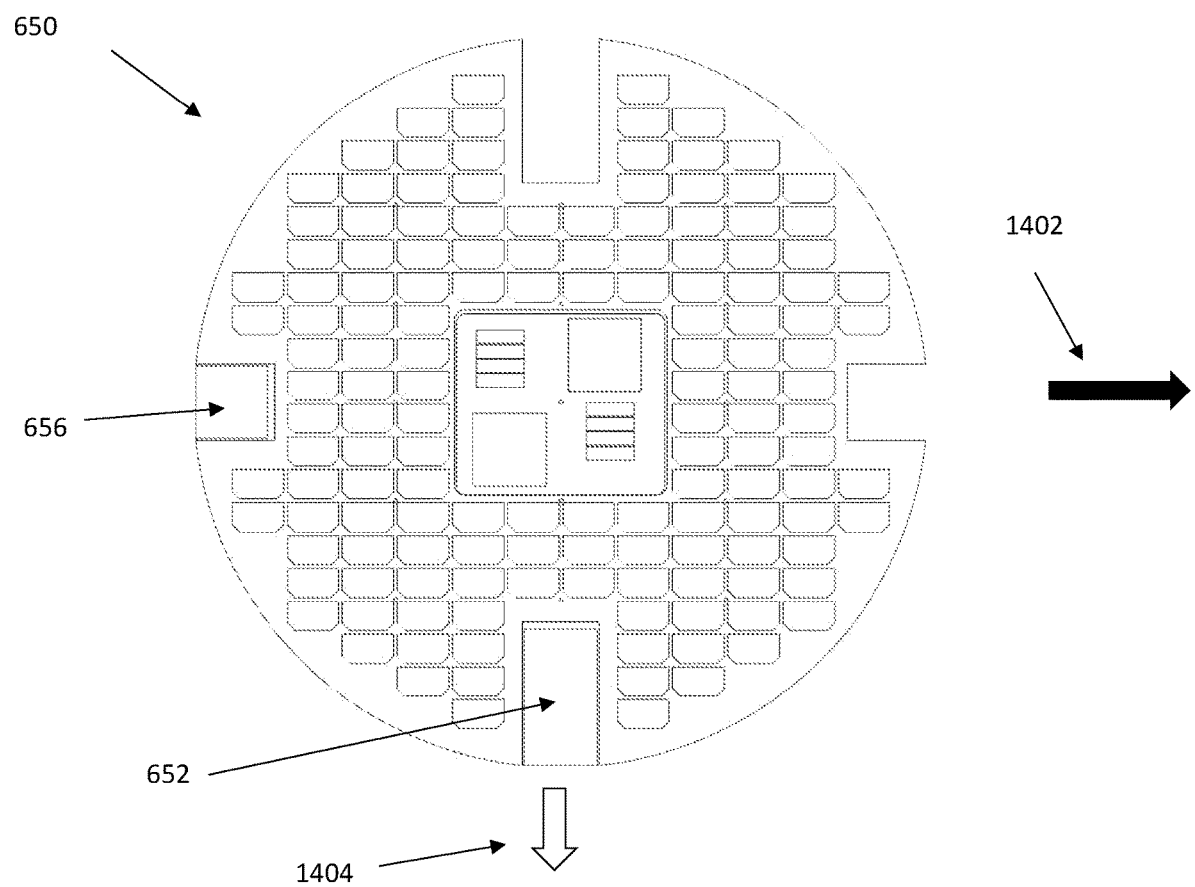

FIG. 14C is a diagram illustrating a spacecraft being flown in an attitude, where the plane of the satellite is in the plane of the orbit and the surface normal of the satellite is perpendicular to both the velocity vector and the vector pointing at nadir, according to an embodiment of the present invention.

FIG. 14D is a diagram illustrating a mode of flying for a satellite with a deployable solar panel, according to an embodiment of the present invention.

DETAILED DESCRIPTION OF THE EMBODIMENTS

Some embodiments pertain to a satellite deployer, and a corresponding satellite configuration, to overcome many of the challenges and limitations of current satellite deployment technologies. Three principal characteristics define the satellite and deployer combination. First, the body of the satellite is made primarily of a structural plate in the form of a three dimensional solid with a thickness being substantially smaller than other dimensions. Second, the satellites are designed to stack one upon another such that launch loads are taken up through the entire stack of satellites rather than having each satellite supported individually by a launch interface device. Third, each satellite has an interface with the satellite deployer. This interface allows the satellites to be deployed one at a time once the launch vehicle is in orbit.

The deployer, in some embodiments, may hold the satellites in a stack as a single unit during launch. A launch lock may hold the satellite stack between top and bottom plates that make mechanical contact, respectively, with the top and bottom satellites in the stack, holding the stack in compression and carrying the launch loads. After launch, the satellite deployer releases the launch lock and subsequently deploys the satellites one at a time.

Structure

Figure 1A:
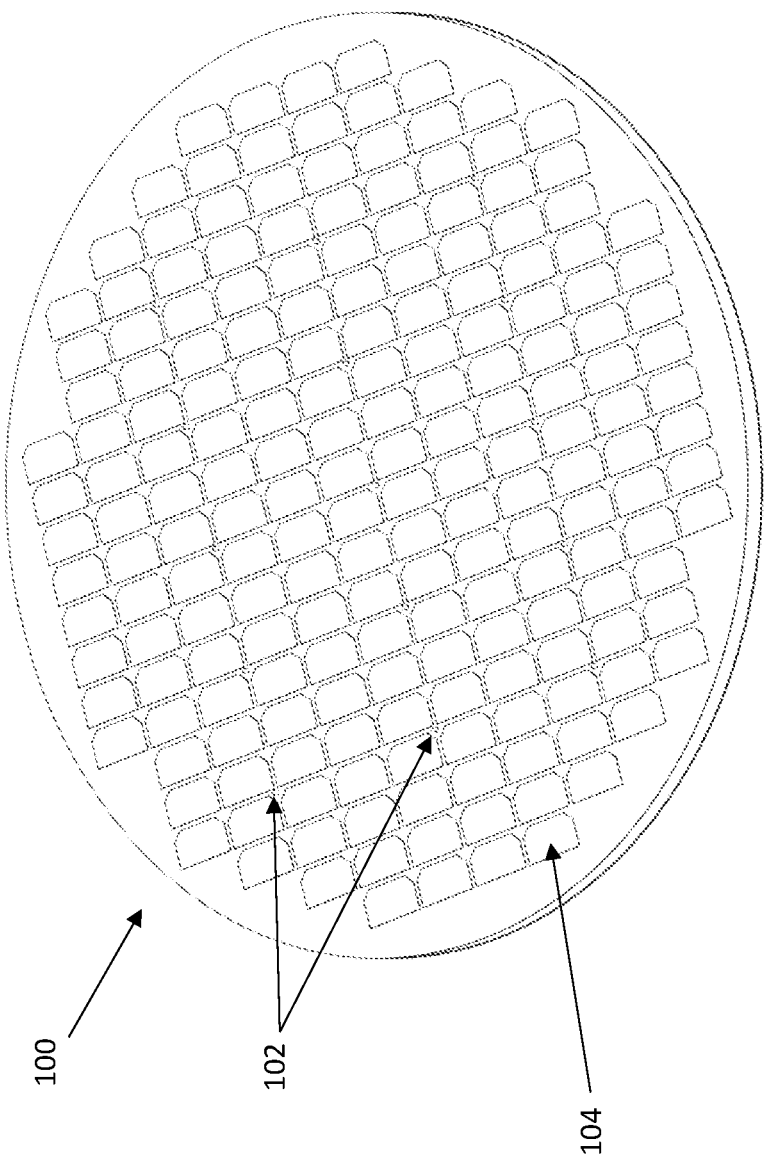

FIGS. 1A and 1B are diagrams illustrating a satellite 100 from top and bottom perspective views, respectively, according to an embodiment of the present invention. In some embodiments, satellite 100 is in the shape of a plate—a three-dimensional solid with a thickness that is small in comparison to its other dimensions. As shown in FIGS. 1A and 1B, the plate is circular, and the satellite is in the form of a disk. In alternative embodiments, the plate may take on other geometric forms, such as a square, a hexagon, or an octagon, to name a few. In some other embodiments, the shape of the plate may be irregular, depending on application. It should be appreciated, however, that in most embodiments the in-plane dimensions are substantially larger than the dimension perpendicular to the plane.

FIG. 2 is a diagram illustrating a structure of the plate 200, according to an embodiment of the present invention. In some embodiments, plate 200 is fabricated from a sandwich panel comprising of two face sheets 204, 206 bonded to a core material 202 between face sheets 204, 206. In some embodiments, core material 202 may be a honeycomb material or a foam material configured to provide structural rigidity while minimizing mass. Further, face sheets 204, 206 may be composed of aluminum or composite materials such as glass/epoxy or graphite/epoxy. Alternative face sheet materials, such as printed circuit board materials, for example, may also be used.

Contact Points

In most typical satellite deployment mechanisms, each satellite has its own interface with the host vehicle through a mechanical adapter. The mechanical adapter typically includes a release mechanism that releases the satellite from the host vehicle on command (or on a timer). As such, a mechanical interface between the satellite and adapter must be robust enough (on both the satellite and the adapter) to carry the entire load of the satellite during launch and at the same time incorporate a mechanism capable of reliably releasing the satellite.

Further, in traditional launch systems, launches that include multiple satellites use multiple satellite interfaces such that no satellite is in direct physical contact with any other satellite, and such that all launch loads are carried directly through the adapter. An exception to this approach occurs when a CubeSat deployer carries multiple CubeSats. For example, the Cal-Poly P-POD, which is designed to carry three CubeSat units, may carry either a single three-unit (3U) CubeSat or multiple smaller CubeSats that together add up to three units. Thus, if there are three 1U CubeSats in the deployer, the CubeSats are stacked sequentially into the deployer and each CubeSat is in mechanical contact with one or more adjacent CubeSats in the deployer.

In those cases, the CubeSat deployer provides a mechanical interface by constraining the CubeSats against lateral motion along two axes with four parallel rails. The CubeSat is constrained on the third axis (along the direction of deployment) by a pusher plate and deployer lid. When the deployer door is commanded to open, all satellites in the deployer are released simultaneously and are pushed out of the deployer by the pusher plate.

To facilitate containment and deployment, each CubeSat includes four rails, which comprise four parallel edges of the cube, that interface with the deployer rails. The CubeSat Design Specification (CDS) places stringent limits on the dimensions and materials of the CubeSat rails to ensure that they fit properly in the deployer and slide freely when the deployer door is opened. The CDS also limits the points of contact between adjacent CubeSats in the same deployer to the ends of the four rails. With this limitation, each pair of adjacent satellites in a deployer has four points of mutual contact. In addition, the CDS limits the dimensions of any components on the end faces relative to the height of the rails to prevent contact other than at the rails. For satellites as small and rigid as CubeSats, this is generally sufficient to ensure that they do not make contact with one another at other points.

For stacked satellites in the form of plates, such as those discussed herein, limiting contact between the satellites to the satellite edges may not provide a robust separation between the satellites across the gap. If the satellites are exceptionally rigid and/or large offsets are made between the height of the edge contact points and the maximum height of components on the faces, then a robust separation may be achieved.

Alternatively, returning to FIGS. 1A and 1B, satellites 100 may be equipped with an array of load-bearing contact points 102 distributed across the top and bottom faces. These contact points 102 may be distributed across the faces in a pattern common to all satellites in the stack. FIG. 5A illustrates a perspective view of a stack 500 of five satellites, according to an embodiment of the present invention. In this embodiment, satellite separation is provided by an array of fifteen load-bearing contact points 102. The number of load-bearing contact points may depend on mission requirements.

FIG. 5B illustrates a side view of a stack of satellites showing the alignment of contact points 102 between satellites 100 in the stack, according to an embodiment of the present invention. The array of contact points 102 allow for the launch loads to be carried through stack 500 without surface-to-surface contact between the satellites in the stack.

Figure 5C:
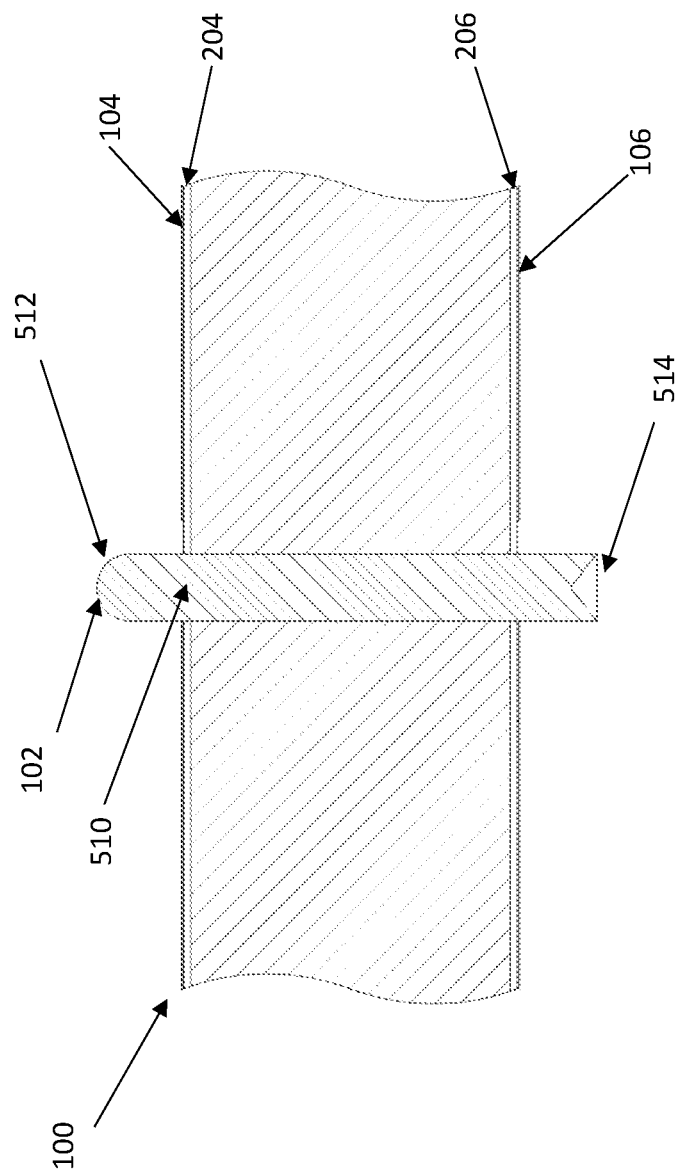
FIG. 5C is a diagram showing a cross-section of portion of a single satellite, according to an embodiment of the present invention.

FIG. 5C is a diagram showing a cross-section of portion of a single satellite 100, according to an embodiment of the present invention. In some embodiments, a contact point 102 in the form of a load-bearing pin 510 is shown to be extending through the thickness of satellite 100 and protruding beyond face sheets 204 and 206. Pin 510 may be a rigid structure capable of carrying a load without damage to satellite 100 and is attached to satellite 100 such that satellite 100 is restrained from moving relative to pin 510. Pin 510 may further incorporate features on either end to facilitate stacking including, for example, a spherical top surface 512 combined with a conical recess 514 at the bottom. When satellites 100 are stacked, as illustrated in FIG. 5D, conical surface 514 of pin 510 in a satellite 100 rests on top of, and is centered by, spherical surface 512 of pin 510 in a lower satellite. As illustrated in FIG. 5D, which is a diagram illustrating partial cross section of a stack 500 of five satellites, the pins 510 provide contact points between the satellites and establish a gap 504 between each satellite 100 within stack 500, according to an embodiment of the present invention.

It should be understood that spacing of contact points 102 is a compromise between minimizing gap 502 between adjacent contact points (to minimize motion of the plate between the contact points) and maximizing gap 502 between the adjacent points. The relative motion of satellites 100 between contact points 102 should be minimized to prevent contact between the satellites during launch vibrations, which would suggest minimizing gap 502 to reduce the distance bridged between contact points 102.

However, as gap 502 gets smaller, more restrictions are placed on placement of satellite components that might be incompatible with contact points. For example, solar cells mounted on the face of satellite 100 may interfere with contact points. To avoid this issue, contact points 102 may be distributed according the standard solar cell sizes. See FIG. 1. Typical solar cells used on CubeSats are 70 mm long and 40 mm wide and often have truncated corners, providing an ideal location for contact points. Using this example, and leaving a gap of 5 mm between adjacent solar cells, an array of contact points spaced at 45 by 75 mm (or any multiple of 45 by 75 mm) may prevent interference with an array of solar cells. The contact points 102 may protrude some distance beyond the faces of each plate to provide space for surface-mounted components (e.g., solar cells or antennas) while ensuring that a gap 504 remains between the satellites so as to minimize the potential for contact between the satellites during launch. The contact points between adjacent satellites in a stack have been defined here in terms of pins with spherical and conical surfaces as an example. It will be appreciated that alternative forms of contact points, such as rails, may also serve the purpose of preventing face-to-face contact between adjacent satellites in a stack.

Distribution of Components

Some satellite components, such as solar cells, radiators, and antennas, need exposure directly to space. Other components, such as electronics, reaction wheels, torque rods, and batteries, are typically contained in the internal volume of spacecraft. In a plate satellite, the ratio of surface area to volume is large compared to a typical spacecraft, and the placement of solar cells and antennas on the surface is straight forward.

Surface Components

Surface components, such as solar cells or antennas, can be mounted directly to the face sheet of satellite 100. In the case of solar cells, for example, satellite 100 may incorporate mount points as well as the wiring to route the power from the solar cells to the power system of satellite 100. If other considerations (e.g., structural, thermal, etc.) allow, this can be facilitated by using a printed circuit board as the face sheet. With reference to FIGS. 1A and 1B, solar cells 104, which are exposed to sunlight, are distributed on one or both face sheets 204 and 206. In many applications, satellites fly with one face always directed toward Earth (nadir) while the opposite face (anti-nadir) is always pointing away from the Earth. In low Earth orbits, the nadir face is rarely exposed to the sun, so the solar cells on the nadir face are rarely illuminated, and therefore, are of limited utility. On the other hand, satellites may not always be under attitude control (e.g., when first launched, or during operational anomalies), and it may therefore be beneficial to have at least a few solar cells on the nadir face (see FIG. 1B) to provide a minimal amount of power should the satellite be in an orientation where the anti-nadir face is always pointing away from the sun.

Internal Components

With a thickness of 2.5 cm, a disk-shaped satellite one meter in diameter has a volume of 20 liters, which is very large compared to, for example, typical CubeSats. As such, there is adequate volume within the satellite for all components not needing to be on one of the faces. However, although the overall volume is large, one of the dimensions is small so the components need to be laid out differently than in traditional satellites. One option is to provide a set of cavities in the core of the sandwich structure to make space for satellite components. FIG. 3 is a diagram illustrating placement of non-structural satellite components within cavities in the satellite core material 202, according to an embodiment of the present invention. In some embodiments, non-structural satellite components, including avionics and payload 304, and a power supply (e.g., batteries) 306, may be distributed between the face sheets in cavities of the core material 202. In this embodiment, mount points (not shown) are provided on the face sheets for the various components and wiring harnesses run between the voids.

Figure 4A:
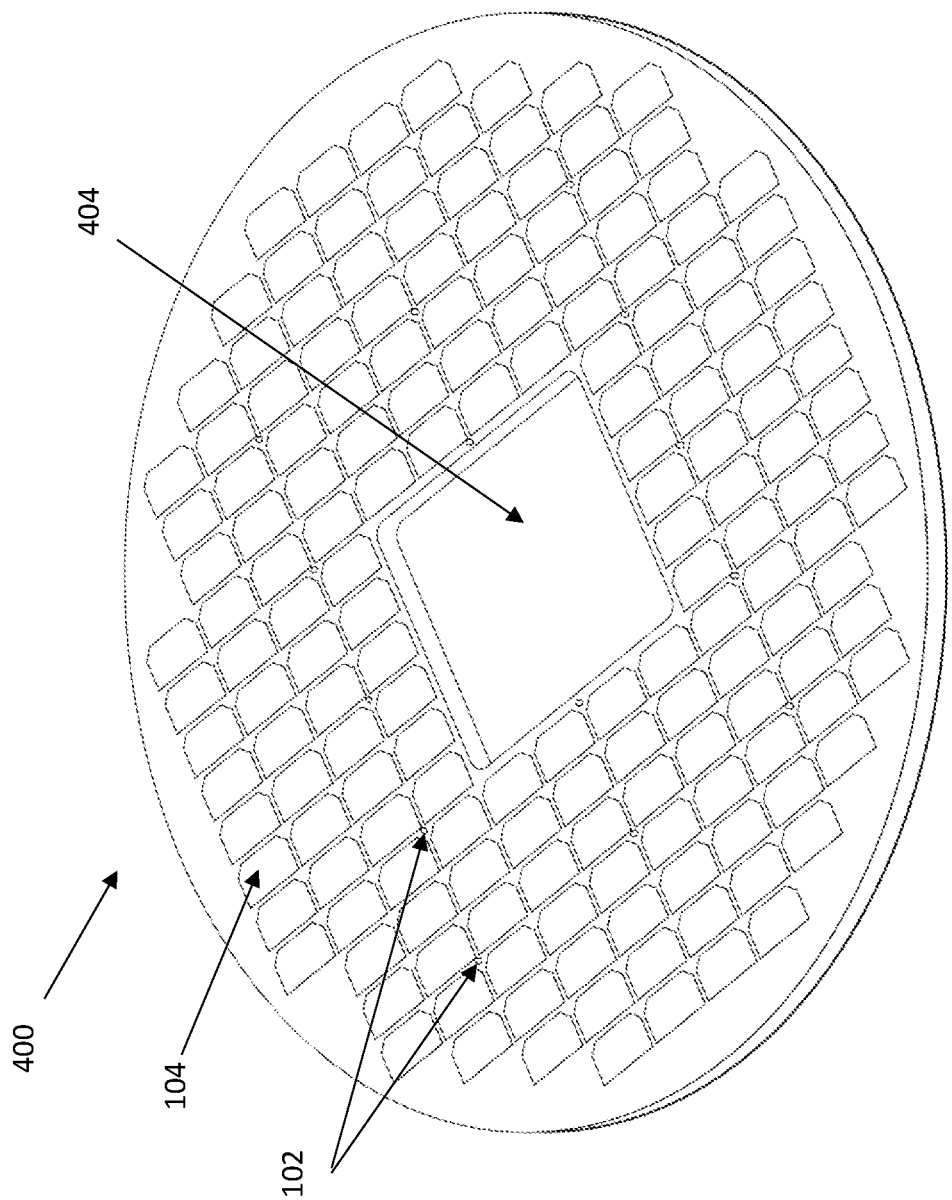
FIG. 4A is a diagram illustrating a satellite with a gap through the core and both face sheets, according to an embodiment of the present invention.
Figure 4B:
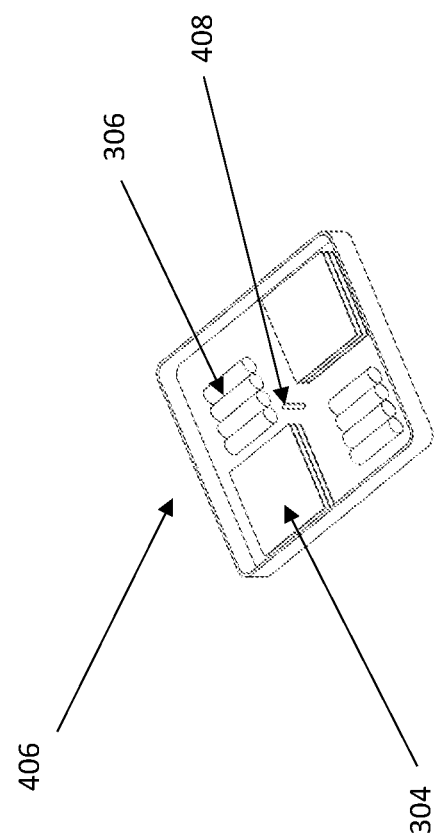
FIG. 4B is diagram illustrating a chassis box containing non-structural satellite components of the satellite, according to an embodiment of the present invention.
Figure 4C:
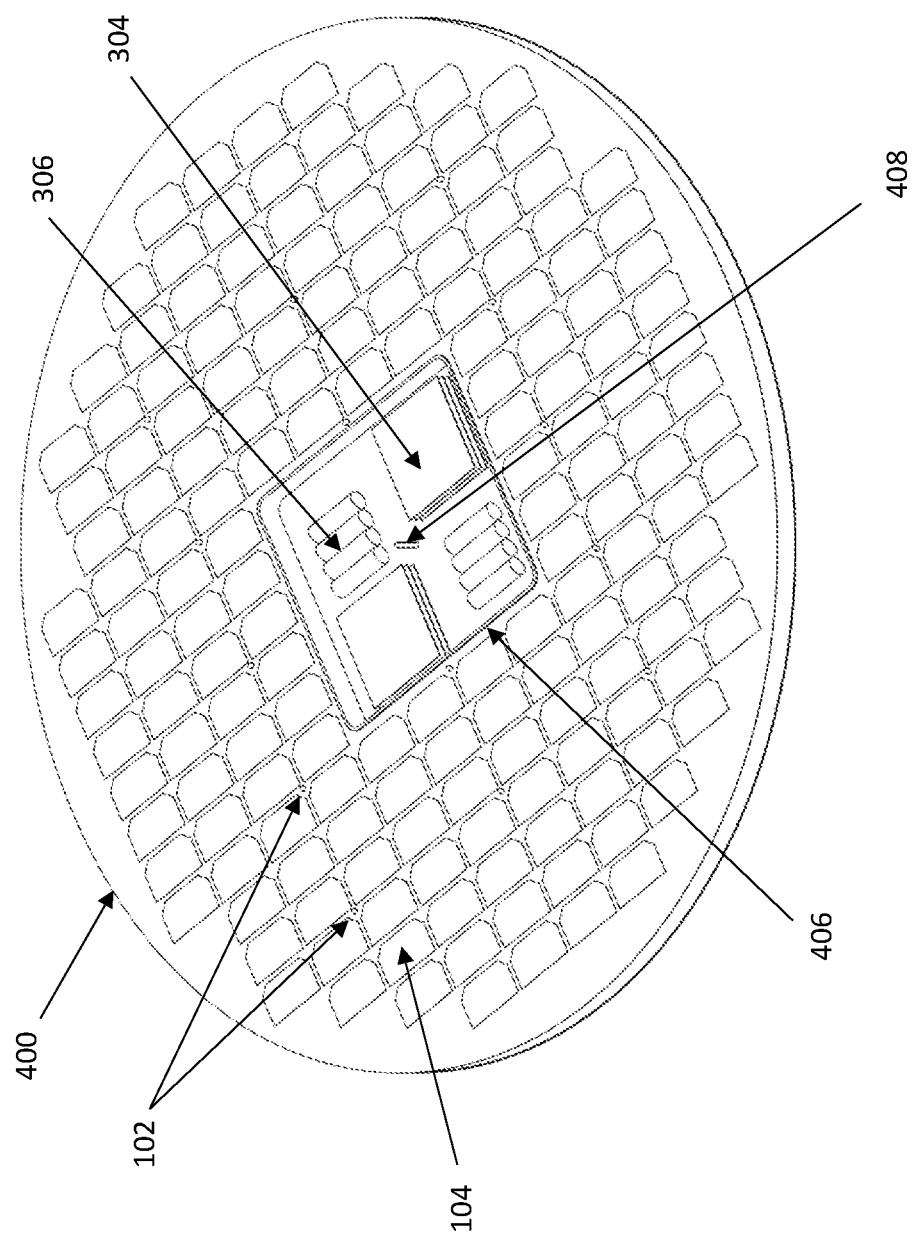
FIG. 4C is a diagram illustrating the assembled combination of satellite and chassis box, according to an embodiment of the present invention.

In an alternative embodiment, the sandwich panel may include one or more gaps, through the core material and one or both face sheets, into which non-structural satellite components may be inserted. FIG. 4A is a diagram illustrating a satellite with a gap 404 through the core and both face sheets, allowing for non-structural satellite components to be inserted therein. For example, as illustrated in FIG. 4B, non-structural satellite components including avionics and payload 304, and a power supply (e.g., batteries) 306, may be distributed in a chassis box 406 sized to fit in gap 404, and with a thickness comparable with the plate thickness. FIG. 4C. is a diagram illustrating the assembled combination of satellite 400 and chassis box 406. Note that chassis box 406 incorporates a structural element 408 in the form of a load pin supporting top and bottom contact points to prevent there being any gaps in the pattern of contact points 102.

Since core 202 has a low density, the placement of components determines the mass properties of satellite 100, and for that reason, components (e.g., chassis box 406) may be placed near the physical center of satellite 100 (e.g., to minimize the moments of inertia). Alternatively, components may be distributed throughout the volume (e.g., to distribute the launch loads around multiple contact points).

Further, in some embodiments, components may be concentrated either near the physical center of satellite 100 or far from the physical center of satellite 100 to control the position of the center of mass of the satellite relative to its geometric center. For example, having the center of mass near a physical edge of satellite 100 may enhance stability when flying in a high-drag environment. On the other hand, having the center of mass near the physical center may allow satellite 100 to tumble, thereby enhancing overall drag and hasting the deorbit process in the event satellite 100 becomes inoperable.

Oversize Components

Since satellite 100 is in the form of a plate and is intended to be stacked upon another satellite during launch, the thickness of each satellite 100 is limited by the number of satellites intended to be stacked and the height of the available launch volume. Assume, for example, that a deployer payload volume is 1 m in diameter and 1 m high. In this example, a stack of 25 disk-shaped satellites may be accommodated if each disk is no more than 1 m in diameter and 4 cm thick. In practice, many satellites do not need to be that thick. For example, a disk 1 m in diameter and 2.5 cm thick has a volume of about 20 liters. By comparison, over 1000 CubeSats launched to date have had volumes of 3.5 liters or smaller. The thickness of a satellite plate in some of these embodiments need be no more than required to contain all necessary components. Since many satellite components and payloads are primarily electronic in nature and the electronics can be laid out in flat arrays, a thickness of 2.5 cm may often be adequate. In general, any satellite component having at least one of its three dimensions smaller than 2.5 cm can be incorporated in a satellite that is 2.5 cm thick. In applications that require components having no dimensions smaller than 2.5 cm, the thickness of the disk may be increased. For example, a disk having a thickness of 10 cm may allow the incorporation of any component that might fit in a CubeSat that is 6U or smaller.

Figure 6A:
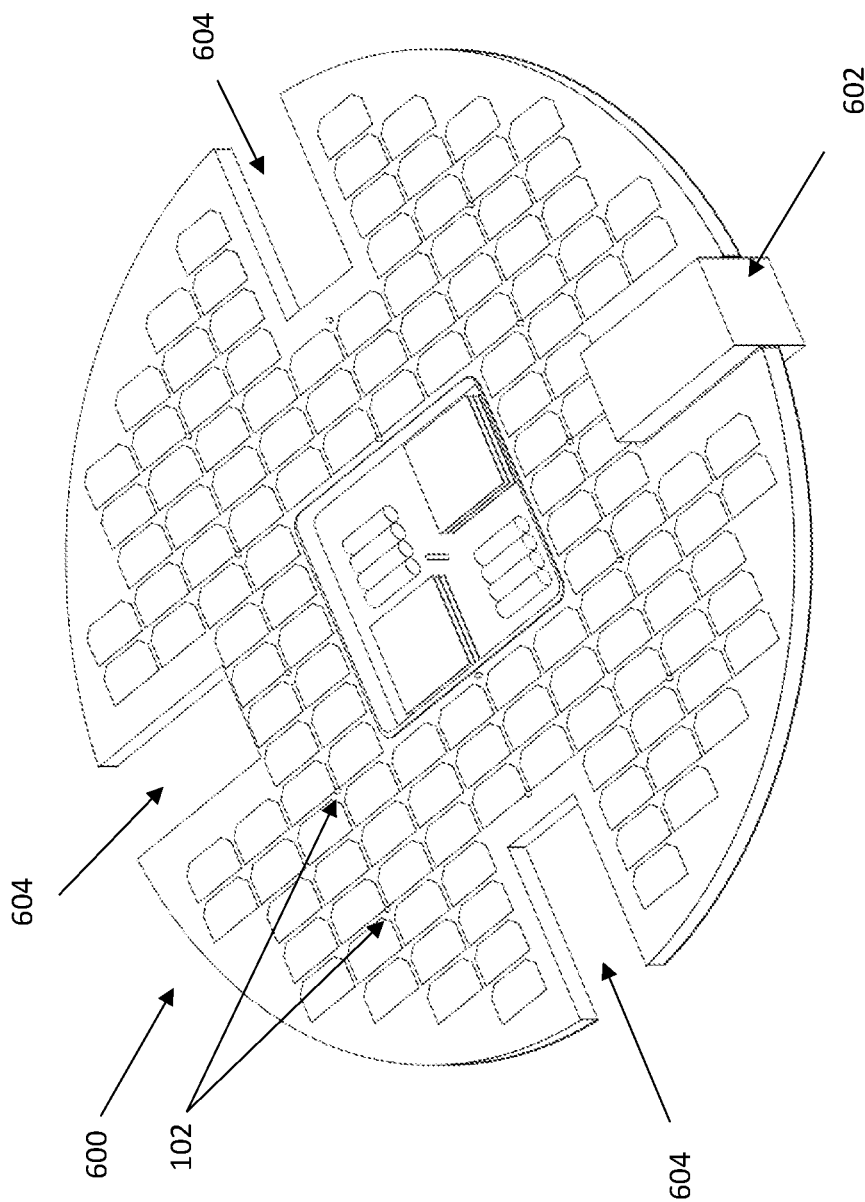
FIG. 6A is a diagram illustrating a satellite with a protruding element and cutouts, according to an embodiment of the present invention.

Although it is expected that most satellite components may be installed in the volume of a relatively thin plate of the satellite, there may be components that do not fit because the dimensions are larger than the thickness of the satellite plate, or because a specific orientation relative to the satellite plane is required. As noted above, in an embodiment, the thickness of the plate may be increased, allowing for the incorporation of larger components. However, in another embodiment, to minimize the average thickness of the satellite plate, certain components may protrude beyond the surface of the satellite plate while providing matching cutouts in adjacent satellites in the stack to allow close stacking of the satellites. FIG. 6A, for example, is a diagram illustrating a satellite 600 with a protruding element 602 and cutouts 604, according to an embodiment of the present invention.

Figure 6B:
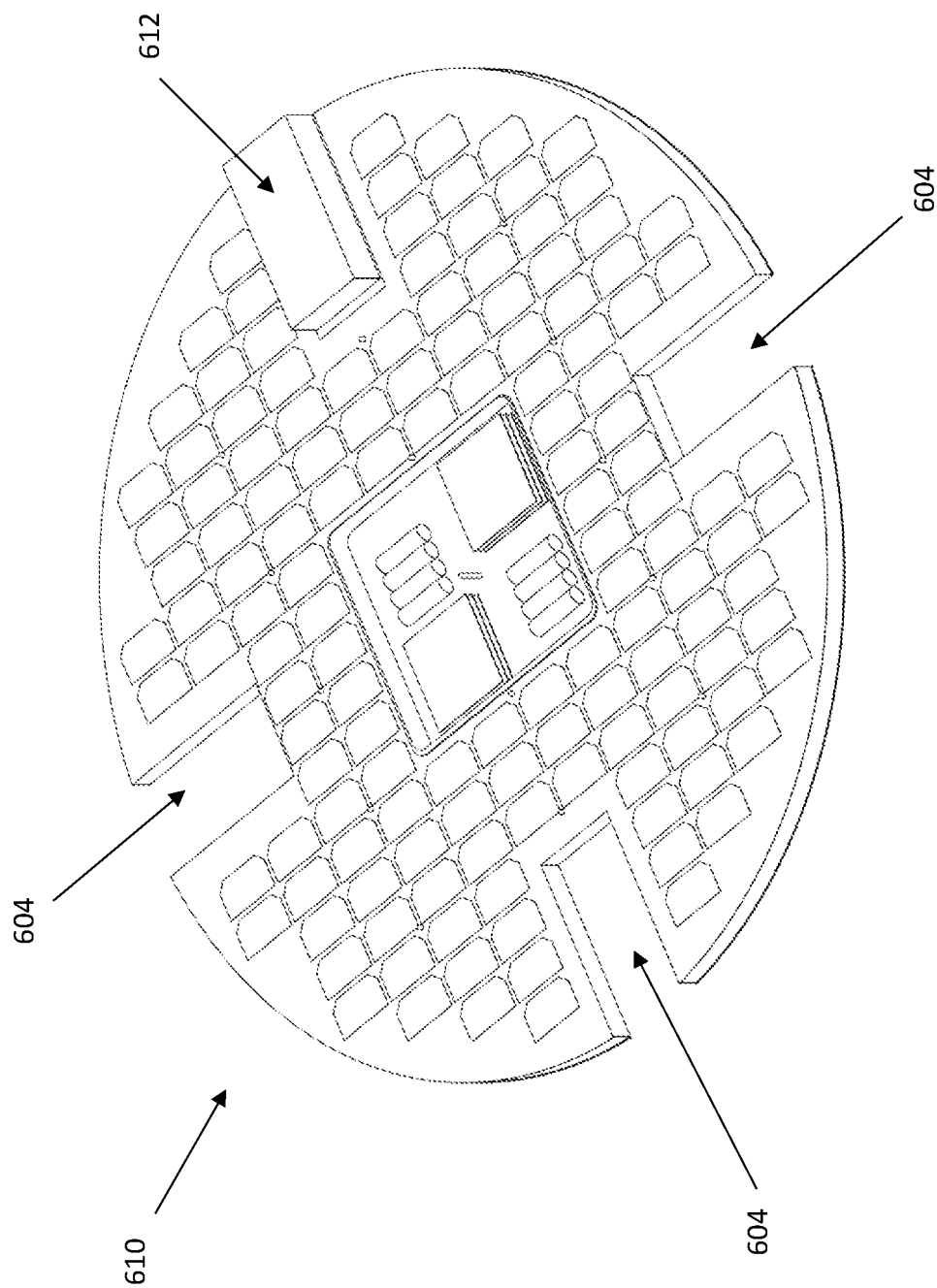
FIG. 6B is a diagram illustrating satellite with protruding element being mounted with a 90-degree offset relative to the protruding element of satellite of FIG. 6A, according to an embodiment of the present invention.

In this embodiment, protruding elements 602 and cutouts 604 make it possible to have a stack of nearly identical satellites. This is achievable provided that cutouts 604 are spaced appropriately and satellites 600 are clocked in the stack, allowing for protruding element 602 of one satellite to align with a cutout 604 in an adjacent satellite. With multiple cutouts 604 and appropriate clocking, it becomes possible to have protruding elements 602 that extend through gaps in more than one adjacent satellite in the stack. For example, a second copy of satellite 600 as illustrated in FIG. 6A may be rotated 90 degrees relative to the first satellite and stacked thereon. However, in this example, the fit may not be perfect because the pattern of contact points 102 is rectangular (to match the rectangular array of solar cells) and does not have 90-degree rotational symmetry. To compensate for this, a second version of the satellite may be fabricated, as illustrated in FIG. 6B. In FIG. 6B, satellite 610 is externally identical to satellite 600 (FIG. 6A) except that protruding element 612 is mounted with a 90-degree offset relative to protruding element 602 of satellite 600. Now it is possible for satellite 610 to be stacked on top of satellite 600 such that protruding elements 602 and 612 align with corresponding gaps 604 in the other satellite while the patterns of contact points 102 on satellites 600 and 610 also align with one another.

Figure 6C:
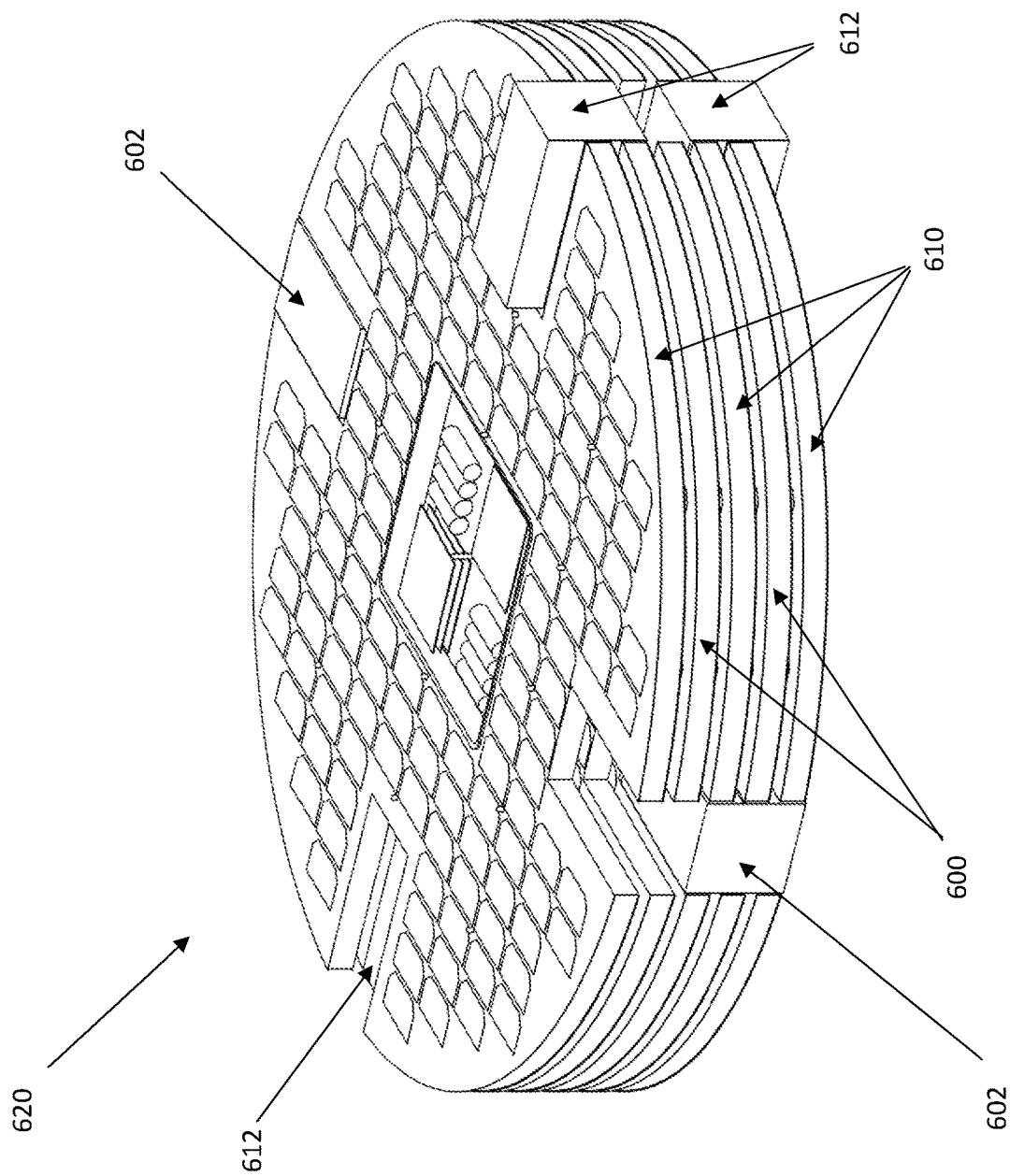
FIG. 6C is a diagram illustrating a perspective view of a stack of five satellites, according to an embodiment of the present invention.

After satellite 610 is stacked on satellite 600, another identical copy of satellite 600 may further be stacked on top of satellite 610 by rotating the second copy of satellite 600 by 180 degrees relative to the first copy. This is possible because the contact points have 180-degree rotational symmetry in this example. Additional satellites may also be added to the stack by alternating between version 600 and 610 with appropriate clocking to build a stack of the desired height. FIG. 6C illustrates a perspective view of a stack 620 of five satellites, two of type 600 and three of type 610, alternating type and clocking as necessary to provide a stable stack.

Figure 6D:
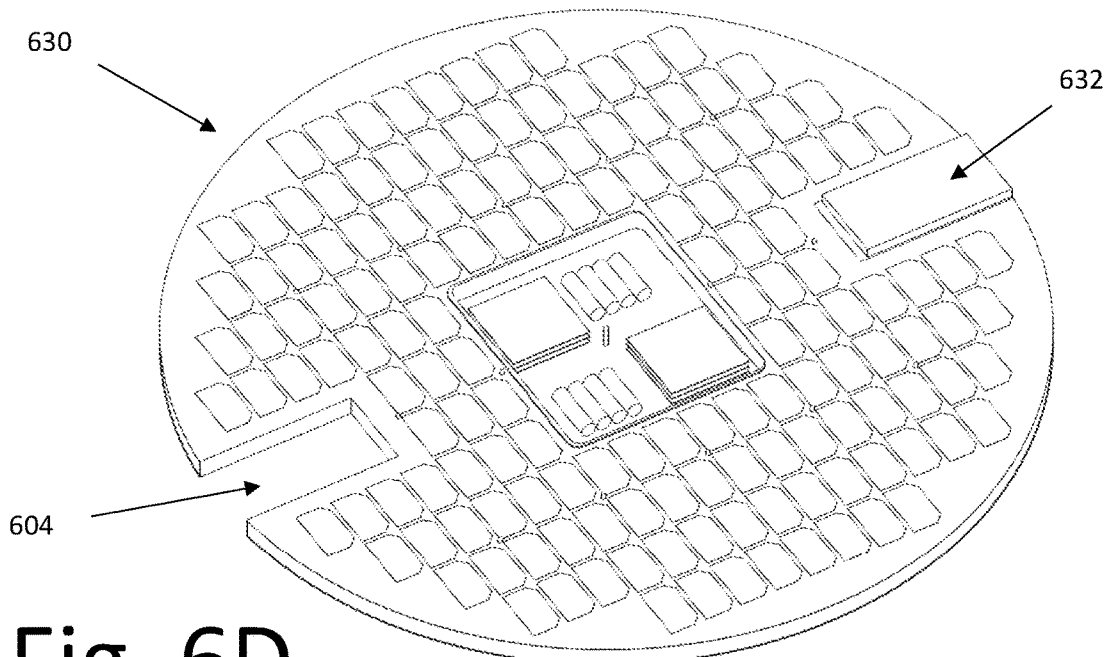
FIG. 6D is a diagram illustrating a satellite with a protruding element where the total height of the protrusion does not exceed twice the inter-satellite spacing, according to an embodiment of the present invention.

It should be noted that successful stacking of satellites with protruding elements involves a tradeoff between the height of the protruding element and the number of cutouts required to accommodate the protrusion in the stack. FIG. 6D illustrates a satellite 630 with a protruding element 632 where the total height of the protrusion does not exceed twice the inter-satellite spacing (as defined by the height of the contact points). As such, multiple (identical) copies of satellite 630 can be stacked by clocking each layer by 180 degrees.

Figure 6E:
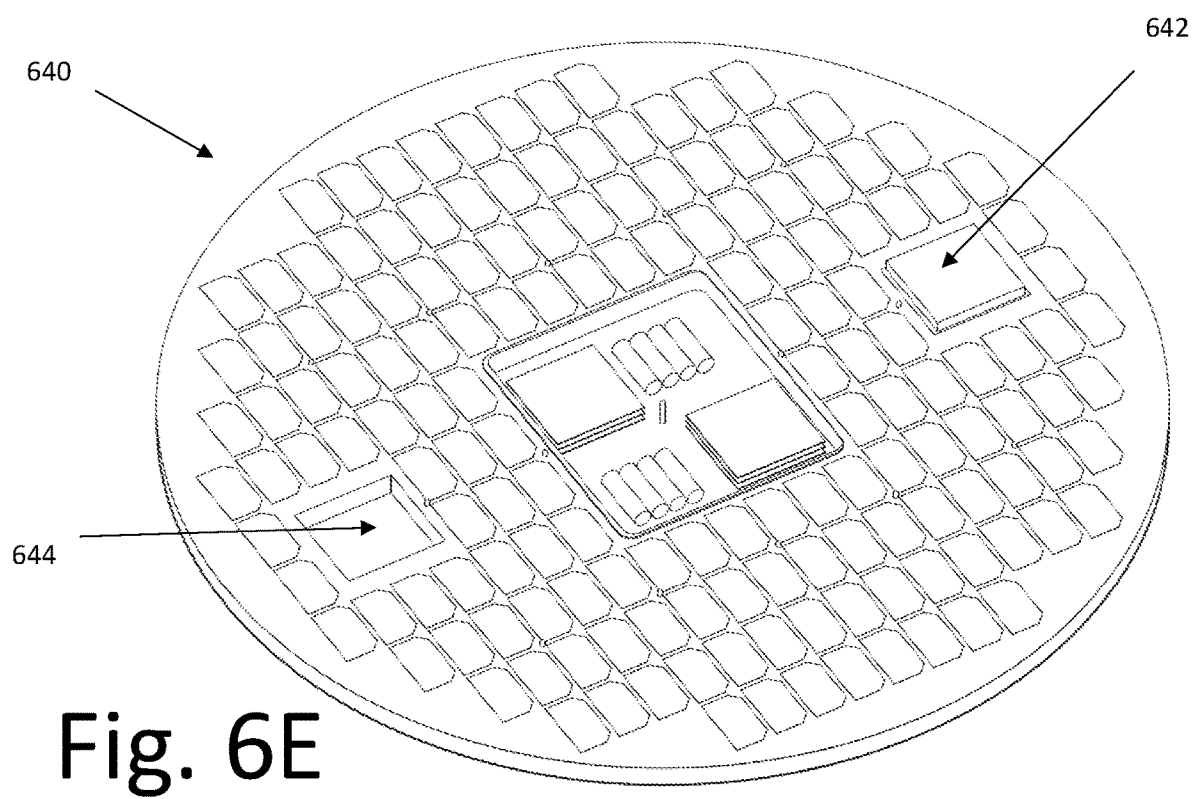
FIG. 6E is a diagram illustrating satellite incorporating a protruding element not at the perimeter of the disk, according to an embodiment of the present invention.

In another embodiment, as illustrated in FIG. 6E, a satellite 640 may incorporate a protruding element 642 not at the perimeter of the disk. In this case, the corresponding gap 644, offset 180 degrees from the protruding element, is also not at the perimeter of the disk. Note, however, that it is not possible to stack identical satellites with protruding elements at the center of symmetry.

Figure 6F:
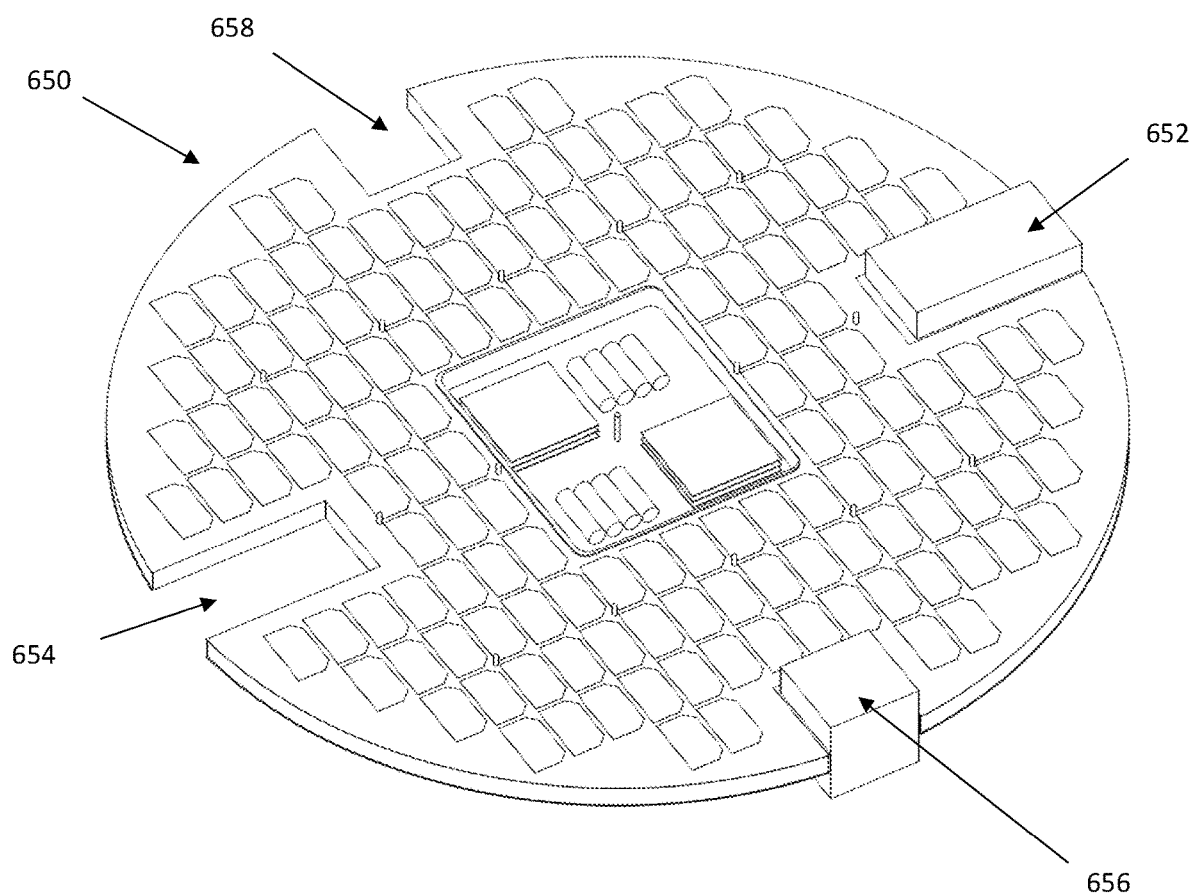
FIG. 6F is a diagram illustrating a satellite incorporating multiple protruding elements of varying sizes, according to an embodiment of the present invention.

In another embodiment, as illustrated in FIG. 6F, a satellite 650 may incorporate multiple protruding elements of varying sizes provided the corresponding gaps map correctly to the protruding elements with a defined rotation. In FIG. 6F, protruding element 652 corresponds with gap 654 after a 180-degree rotation, while protruding element 656, which is smaller than protruding element 652, corresponds, with the same 180-degree rotation, with gap 658, which is smaller than gap 654. With these correspondences, multiple copies of satellite 650 may stack one upon another with 180-degree clocking between successive satellites in the stack.

Figure 6G:
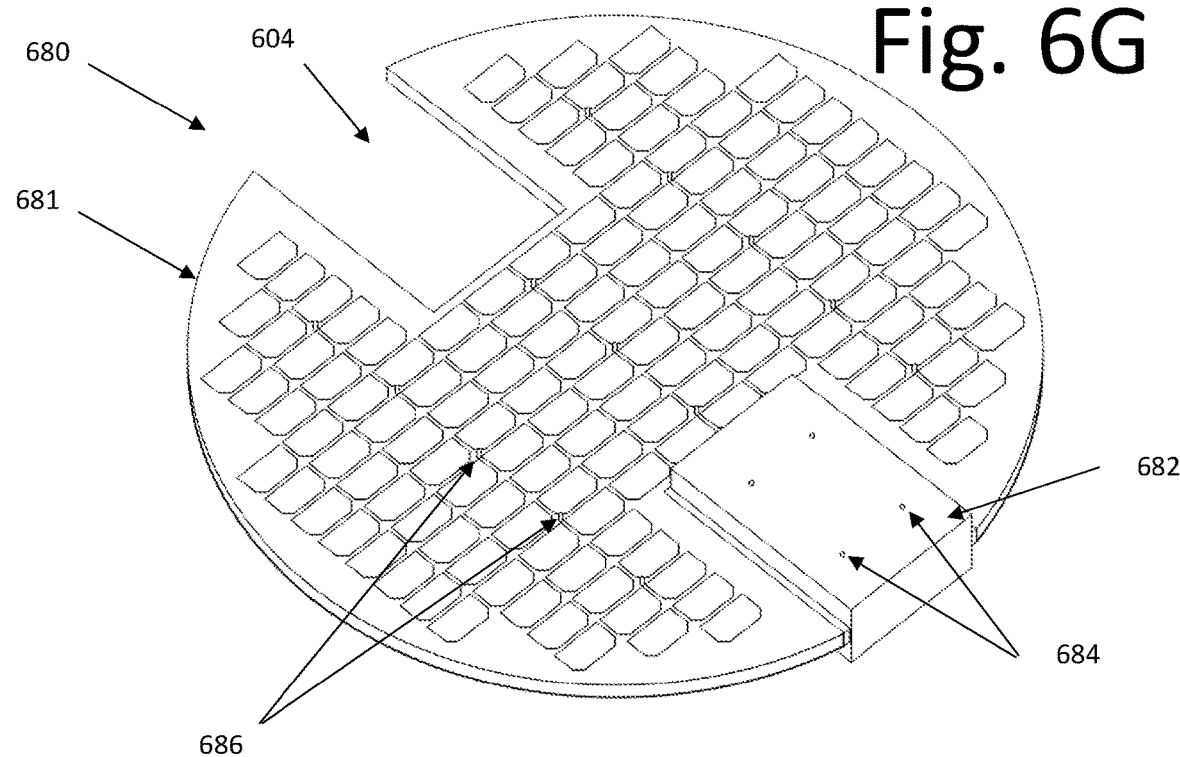
Figure 6H:
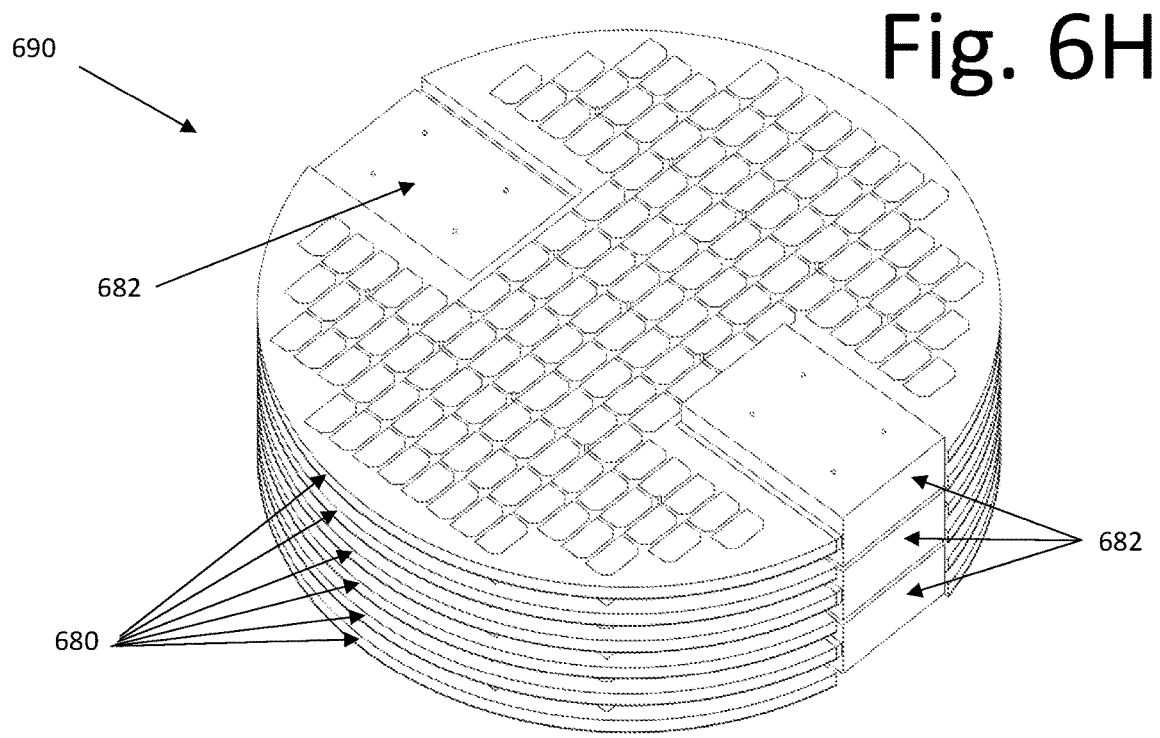

In yet another embodiment, as illustrated in FIGS. 6G, 6H, and 6I, a satellite may incorporate a protruding element that is large enough to displace one or more members of the standard pattern of contact points. Further, the protruding element may be of sufficient mass that there may be a concern that contact points in the standard pattern may not provide sufficient support to handle launch loads in the protruding element. In these cases, additional contact points may be incorporated into the protruding elements to provide direct support between adjacent protruding elements in a stack. Such additional contact points may follow the same spacing pattern as the standard contact points in the disk, or they may be spaced in a pattern specific to the protrusion e.g. to provide additional support for the additional mass of the protrusion. By way of example, FIG. 6G illustrates a satellite 680 with a disk-shaped portion 681 and a protruding element 682 wherein disk-shaped portion 681 is 100 cm in diameter and 2.5 cm thick while protruding element 682 has dimensions of 10 by 20 by 30 cm, comparable to standard dimensions for a 6U CubeSat. While it would be possible for satellite disk 681 to include three cutouts, allowing close stacking of the satellites in a manner similar to that illustrated in FIG. 6C, it may be beneficial to provide only a single cutout, as illustrated in FIG. 6G, in order to maintain a larger net surface area on the disk, for example to provide sufficient solar power.

Multiple copies of satellite 680 may be stacked by clocking successive satellites in the stack by 180 degrees. FIG. 6H provides a perspective view of a stack 690 of six satellites 680, while FIG. 6I provides an edge-on view of stack 690 to enhance visibility of the contact points. Note that because the total thickness of protruding element 682 is greater than twice the thickness of disk portion 681 of satellite 680, a stacking arrangement including only 180-degree clocking may be possible only if the gap between successive disk portions 681 is larger than the gap between successive protruding elements 682 in the stack. In this example, the inter-satellite spacing is chosen to be 5.5 cm (centerline to centerline). As such, the centerline spacing between successive protruding elements (on alternating satellites because of the clocking) is 11 cm. Since the protruding elements are 10 cm thick, the gap 694 between them is 1 cm. At the same time, the gap 692 between adjacent disk portions is the single-satellite spacing (5.5 cm) minus the disk thickness (2.5 cm), or 3 cm. This is most clearly illustrated in FIG. 6I, where gap 692 between adjacent disks is seen to be three times gap 694 between adjacent protruding elements. To enable this spacing, the contact points between adjacent satellites in the stack are defined by load pins 684 and 686 that are longer than those used for closely spaced stacks such as that illustrated in FIG. 6C. Specifically, in this example, load pins 684 in the protruding elements have a length of 11 cm between contact points while load pins 686 in the disk portion of the satellite have a length of 5.5 cm between contact points.

In satellite stack 690, the top and bottom satellites present a set of contact points that are not in a common plane. In loading such a stack into a satellite deployer, it may be necessary to provide an offset in the deployer or to use an adapter satellite at the bottom and top of the stack. Such an adapter satellite could be, for example, a simple disk with a single cutout but no protruding element.

Alternate Shapes

In general, a stackable satellite is a three-dimensional (3D) object that is short in one dimension in comparison to the other two dimensions. The short dimension allows for stacking while the other two dimensions can be made as large as needed to satisfy mission requirements or as large as possible within the constraints of the launch volume. For example, a single stack of satellites on a launch vehicle with a cylindrical payload envelope can make most use of the volume when the plates are circular. See, for example, FIG. 11A. FIG. 11A is a diagram illustrating a launch vehicle payload fairing 1100 enclosing a payload volume 1102. Within payload volume 1102, a stack of satellites may be included. In one example, a launch vehicle, such as the Rocket Lab Electron, has a payload envelope that is one meter in diameter up to a height of at least 80 cm. In this example, a stack of 20 circular satellites, each one meter in diameter and 2.5 cm thick, and stacked on 3.5-cm centers (to provide clearance for surface components) may easily fit within the volume, leaving little unused space around the perimeter. Also, in this example, square satellites, on the other hand, may not make maximum use of the available volume. In another embodiment, the payload volume available on a port on an ESPA ring, for example, may have a square cross section, and a stack of square satellites in this embodiment can make the most use of that volume. See, for example, FIG. 10A, which shows a square plate satellite 1000 shaped to take maximum advantage of the available payload volume on an ESPA port. Other shapes of flat plates may also be useful for selected applications. FIG. 10B illustrates a flat-plate satellite 1010 in the shape of a hexagon. Additional embodiments may also include other geometric shapes, such as octagons, triangles, or ellipses, or the flat-plate satellites may take an irregular shape.

There may also be applications where the plates are not flat. FIG. 11B illustrates a satellite 1104 in the form of a conical shell. Multiple copies satellite 1104 may be stacked allowing, for example, a stack of 20 satellites to fit within payload volume 1102 inside payload fairing 1100, as illustrated in cross section in FIG. 11C. Other embodiments may include satellites in the shape of spherical shells, cylindrical shells, pyramids, wedges, or any stackable shape.

External Features

In certain embodiments, the planar structure of the satellite may facilitate large-area deployable components. In an embodiment, such as that shown in FIGS. 7A and 7B, satellite 700 may be in the shape of a disk 702 with solar panels and electronics. In this embodiment, a deployable panel 704, also in the shape of a disk, is connected via a hinge 706. FIG. 7A illustrates a perspective view of a satellite 700 with panel 704 deployed, while FIG. 7B illustrates a perspective view of this configuration with panel 704 stowed in the launch configuration. To facilitate stacking, disk 702 includes load pins 708 and panel 704 includes load pins 710 to provide contact points with adjacent satellites in the stack as well as contact points 712 between disk 702 and panel 704. FIG. 8 shows a side view of satellite 700 with closeup details of the load pins and hinge. As shown in FIG. 8, load pin 708 in disk 702 protrudes below the disk a distance sufficient to ensure standoff between satellite 700 and a satellite that may be stacked below it. Load pin 708 also protrudes above disk 702 a distance approximately half the width of the gap 712 between disk 702 and panel 704. Similarly, load pin 710 in panel 704 protrudes below panel 704 approximately half the width of gap 712 such that the two load pins meet at contact point 712 and maintain separation between disk 702 and panel 704. Finally, load pin 710 in panel 704 also protrudes above panel 704 a distance sufficient to ensure standoff between satellite 700 and a satellite that may be stacked above it.

As shown in FIG. 9, certain embodiments include a non-deployable stand-off panel for thermal control or isolation of an RF antenna. Satellite 900 includes a disk 902 and a stand-off panel 904 separated from disk 902 by gap 912. Load pin 908 extends through, and is connected to, both disk 902 and panel 904, maintaining the separation between them. As in other embodiments, load pin 908 protrudes beyond the surface of both disk 902 and panel 904 sufficiently to provide contact points with adjacent satellites that may be stacked above or below satellite 900 during launch.

In another embodiment, such as that shown in FIGS. 10C and 10D, a series of consecutive satellite plates arranged in a stack 1020 may be connected via hinges 1022 in a manner that allows deployment into a larger flat structure 1030 once in space. In this embodiment, an array of seven hexagonal satellites that can be deployed is shown with hinges 1022 along the edges of satellite plates in stack 1020. To reach the final configuration illustrated in FIG. 10D, the plates in stack 1020 may be stacked alternately face up and face down, and the hinges may be mounted such that, after deployment, half of the hinges are on the top of structure 1030 and half are on the bottom. Multiple arrangements of hinges are possible, but each plate in stack 1020 may have a hinged connection both to the plate above and the plate below. Because they are on the ends of the stack, top plate 1024 and bottom plate 1026 have only one hinge each. In the configuration illustrated in FIG. 10D, top plate 1024 and bottom plate 1026 end up in the locations indicated in FIG. 10D after deployment, and hinges on seams 1032 are on the top of structure 1030 while hinges on seams 1034 are on the bottom of structure 1030.

Deployer

The deployer is configured to contain the stacked satellites during launch and then deploy them one at a time after reaching orbit. In traditional satellite launch systems, each satellite has an interface with the launch vehicle such that each satellite can be released individually. In general, multiple satellites on a single launch vehicle are not in contact with one another. In CubeSats, in contrast, multiple satellites may be stacked in a single CubeSat deployer. The CubeSat deployer is a canister with a latched lid and a spring-loaded pusher plate configured to push the CubeSat(s) out of the deployer once the lid latch is released. When multiple CubeSats are in a single container, releasing the lid latch results in all of the contained CubeSats being deployed at the same time. In general, no more than three CubeSats are carried in a single deployer, so potential issues with simultaneous release (such as recontact between satellites) are limited.

FIG. 12 is a diagram illustrating a deployer 1200, according to an embodiment of the present invention. For example, a plurality of stacked satellite plates 1212 may be placed within a container 1202, allowing for sequential release. Container 1202 may include side walls 1204, base plate 1220, and lid 1230. Lid 1230 may be attached to side wall 1204 by hinge 1232 and held closed by latch 1234. Lid 1230 further includes load pins 1236 configured to align with corresponding load pins 1214 in satellites 1212. Base plate 1220 also includes load pins 1222 configured to align with load pins 1214 in satellites 1212. Satellites 1212 are configured to be contained in a stack with a compression load perpendicular to the face of satellites 1212. This load is provided by deployer 1200, wherein latched lid 1230 may compress the stack against base plate 1220 through load pins 1222 and 1236. Once reaching orbit, latch 1234 releases lid 1230, which swings at least 90 degrees on hinge 1232 to allow release of satellites 1212.

To prevent satellites 1212 all releasing simultaneously once lid 1230 is opened, the satellites are also constrained by a deployment mechanism designed to release the satellites one at a time. However, because the launch loads are taken up by the lid and base plate, the deployment mechanism does not have to deal with launch loads and can be much less robust, needing only to manage the release of the satellites in the absence of gravity.

One approach to the single-satellite release process is to incorporate into each satellite a mechanism that holds on to the satellite below it in the stack, and including a means to activate the mechanism on command, on a timer, or on a delay that automatically activates a release on each satellite at some interval after the satellite above it in the stack is released.

FIGS. 13A and 13B are diagrams illustrating perspective views from the top and bottom, respectively, of a satellite 1300 incorporating release mechanisms according to an embodiment of the present invention. Satellite 1300 includes two voids 1302 through the thickness of the plate, wherein each void contains a latch 1304 configured to engage with similar latches on satellites stacked above and below satellite 1300. FIGS. 13C and 13D show a cross section of a portion of satellite 1300 with latch 1304 respectively in the closed and open positions. FIG. 13E shows a cross section of a portion of a stack 1310 of satellites 1300 illustrating the manner in which latches 1304 on successive satellites engage with one another. FIG. 13F illustrates a normal mode of operation of the latches 1322, according to an embodiment of the invention. In FIG. 13F, latch 1322 has turned 90 degrees clockwise to the open position, thereby releasing the hold between satellite 1320 and satellite 1324, the latter of which becomes the top satellite in the remaining stack. FIG. 13G illustrates a mode of operation of this embodiment should one latch fail to operate correctly. In FIG. 13G, latch 1332 had previously been commanded to rotate to the open position to release satellite 1330 from the top of the stack.

However, in this example, latch 1332 failed to operate and satellite 1330 remained attached to satellite 1340, which was also attached to the remaining stack. After the failure of latch 1332, a new instruction was sent commanding latch 1342 in satellite 1340 to open. In this case, latch 1342 operated as instructed, thereby simultaneously releasing the connection between satellites 1330 and 1340 and the connection between satellites 1340 and 1324, thereby achieving a successful deployment of satellite 1330 even though its latch 1332 failed to operate. Thus, in this embodiment, latches 1322 provides automatic redundancy for each deployment.

An alternative approach to having latches built into the satellites is to incorporate in the wall of the deployer a mechanism that individually restrains each satellite in the stack such that the satellites can be released one at a time, starting with the top satellite and working down through the stack.

Manner of Flying

Satellites in space generally experience very little drag because the atmospheric density is exceedingly low. However, in low Earth orbit (LEO), atmospheric density increases as orbit altitude decreases and atmospheric drag becomes significant, limiting the orbit lifetime for most satellites orbiting below about 800 km altitude. The effect of atmospheric drag is inversely proportional to the ballistic coefficient (the ratio of mass to cross sectional drag area); satellites with a high ballistic coefficient are less affected by atmospheric drag than satellites with a low ballistic coefficient. For a flat plate in LEO, since the mass is constant but the cross-sectional drag area is a function of flight attitude, the flight attitude has a significant impact on the ballistic coefficient, and therefore atmospheric drag. FIG. 14A illustrates a plate satellite 1400 in a low-drag orientation, where a vector 1406 normal to the plate surface is perpendicular to the velocity vector 1402 and parallel to a vector 1404 directed toward Earth. This attitude would be useful, for example, if one face of the plate included a payload requiring that it be pointed at nadir. In this attitude, the satellite may have a high ballistic coefficient, the drag may be minimum, and the orbital lifetime may be as long as that of any other satellite. If, however, as illustrated in FIG. 14B, the satellite is flown with the plate-normal vector 1406 parallel to velocity vector 1402, the ballistic coefficient is small, drag is high, and satellite lifetime is short. As such, the attitude-control system can be used to increase drag and deorbit a plate satellite at end of life.

As illustrated in FIG. 14C, spacecraft 650 may be flown in an attitude, where the plane of the satellite is in the plane of the orbit and the surface normal of the satellite is perpendicular to both the velocity vector 1402 and the vector 1404 pointing at nadir. In this example, as shown in FIG. 14A, the ballistic coefficient is high and the effects of drag are decreased. This attitude may be useful, for example, with a satellite of the configuration shown in FIG. 6F, where larger protrusion 652 may be a payload that requires pointing at Earth while smaller protrusion 656 may be a propulsion system configured to provide thrust to the spacecraft allowing it to recover orbital energy lost to drag, and thereby maintaining orbit in a higher-drag (e.g. lower-altitude) environment for an extended time.

FIG. 14D illustrates a mode of flying for a satellite 700 with a deployable solar panel, as previously illustrated in FIG. 7A. In FIG. 14D, velocity vector 1422 is into the page and the orbital plane 1420 is perpendicular to the page. In this embodiment, satellite 700 is oriented such that the nadir face of satellite disk 702 is pointed along the Earth-nadir vector 1404 (to support, for example, a payload in disk 702 that may need to be pointed at Earth). Solar panel 704 is deployed about 30 degrees above the plane of disk 702 such that vector 1408 normal to the surface of panel 704, as well as vector 1406 normal to disk 702, are both perpendicular to velocity vector 1422. In this embodiment, the ballistic coefficient is high, drag is minimized, and orbit lifetime is maximized. This configuration may also be useful for maximizing available solar power as the plane of the orbit precesses relative to the solar direction. For example, when the beta angle (the angle between the plane of the orbit and a vector to or from the sun) is low (arrow 1424), solar cells on the anti-nadir face of disk 702 and the top face of panel 704 are illuminated over half of each orbit, with the angle of illumination varying between zero and 90 degrees (relative to the plane of disk 702), and the orbit average available power is about one third of the peak power. When the beta angle is high (as indicated by arrow 1426), solar cells on the anti-nadir face of disk 702 are not illuminated during any part of the orbit, while cells on the top face of panel 704 are illuminated continuously (since the satellite never goes through eclipse when the beta angle is high). The power collected by the cells on panel 704 is reduced by about a factor of two relative to the peak possible power with direct normal illumination, but the power is available throughout the orbit. As such the orbit average power available to the satellite is about the same at either high or low beta angles. Intermediate beta angles (see arrow 1428) provides higher peak power to cells mounted on panel 704 and some power to cells mounted on disk 702, but orbital variations due to non-ideal pointing reduces orbit average power relative to the peak. The angle between panel 704 and disk 702 can be adjusted to tune power availability if so desired.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A satellite, comprising:
a structural plate having a thickness smaller than a width of the satellite, the structural plate composed of a sandwich panel comprising two face sheets and a low-density core material ("core material"), each face sheet directly bonded to an outer surface of the core material;
components protruding above and/or below the structural plate; and
cutouts in the structural plate displaced from the protruding components configured to facilitate stacking of the satellite with an adjacent satellite, the satellite and the adjacent satellite being clocked with respect to one another.

2. The satellite of claim 1, wherein the core material is a honeycomb material or a foam material configured to provide structural rigidity while minimizing mass.

3. The satellite of claim 1, wherein the two face sheets are composed of aluminum or composite material, or printed circuit boards.

4. The satellite of claim 1, further comprising:
non-structural components between the two face sheets in one or more cavities of the core material.

5. The satellite of claim 1, further comprising:
one or more solar cells exposed to sunlight are distributed on one or both of the two face sheets.

6. The satellite of claim 1, wherein the sandwich panel comprises one or more gaps through the core material and the one or both of the two face sheets into which non-structural components are inserted.

7. The satellite of claim 6, wherein the one or more gaps are configured to distribute the non-structural components in one or more chassis boxes sized to fit the one or more gaps.

8. The satellite of claim 7, wherein the one or more chassis boxes incorporate a structural element in form of a pin supporting a top and bottom of the plurality of contact points, preventing any gaps in a pattern of the plurality of contact points.

9. The of claim 1, wherein the plurality of contact points are distributed across the two face sheets in a pattern common to all satellites in a stack of satellites.

10. The satellite of claim 1, wherein the plurality of contact points are configured to carry launch loads through a stack of satellites without surface-to-surface contact between the satellite and other satellites in the stack.

11. The satellite of claim of claim 1, wherein each of the plurality of contact points are load-bearing pins extending through a thickness of the satellite and protruding through the two face sheets.

12. The satellite of claim 11, wherein the load bearing pins are configured to carry a load without damaging the satellite, and
the load bearing pins attached to the satellite, restraining the satellite from movement relative to the load bearing pins.

13. The satellite of claim 11, wherein the load bearing pins comprise a spherical top surface combined with a conical recess, and
when the satellite is stacked on top of another satellite, a surface of the conical recess rests on top of a spherical surface of a load bearing pin of the other satellite.

14. A system, comprising:
a plurality of satellites, each comprising:
a structural plate having a thickness smaller than a width of each of the plurality of satellites, the structural plate composed of a sandwich panel comprising two face sheets and a low-density core material ("core material"), each face sheet directly bonded to an outer surface of the core material, and
a plurality of contact points distributed on a face of each of the plurality of satellites, each of the plurality of contact points are configured to facilitate stacking of the plurality of satellites directly on top of one another,
wherein two or more of the plurality of satellites comprising
components protruding above and/or below the structural plate, and
cutouts in the structural plate displaced from the protruding components configured to facilitate stacking of the plurality of satellites when adjacent satellites in a stack of the plurality of satellites are clocked with respect to one another.

15. An apparatus, comprising:
two or more satellites , each comprising
a structural plate having a thickness smaller than a width of the two or more satellites, wherein the structural plate composed of a sandwich panel comprising two face sheets and a low-density core material ("core material"), each face sheet directly bonded to an outer surface of the core material; and
a plurality of contact points distributed on a face of the two or more satellites, each of the plurality of contact points are configured to facilitate stacking of the two or more satellites directly on top of one another,
wherein each of the two or more satellites comprising
components protruding above and/or below the structural plate, and
cutouts in the structural plate displaced from the protruding components configured to facilitate stacking of the two or more satellites when adjacent satellites are clocked with respect to one another in a stack of the two or more satellites.

16. The apparatus of claim 15, wherein the sandwich panel comprises one or more gaps through the core material and the one or both of the two face sheets into which non-structural components are inserted.

17. The apparatus of claim 16, wherein the one or more gaps are configured to distribute the non-structural components in one or more chassis boxes sized to fit the one or more gaps.

18. The apparatus of claim 17, wherein the one or more chassis boxes incorporates a structural element in form of a pin supporting a top and bottom of the plurality of contact points, preventing gaps in a pattern of the plurality of contact points.

19. The apparatus of claim 15, wherein, when the two or more satellites are stacked on top of one another, at least one of the two or more satellites is oriented at an angle with respect to an adjacent satellite, allowing protruding elements of the at least one of the two or more satellites to fit within cutouts in the adjacent satellite.

20. The system of claim 14, when one of the plurality of satellites is stacked on another one of the plurality of satellites, the one of the plurality of the satellites is oriented at an angle with respect to the other one of the plurality of satellites, allowing protruding elements of the one of the plurality of satellites to fit within the cutouts of the other one of the plurality of satellites.

21. The satellite of claim 1, further comprising:
a plurality of contact points distributed on a face of the satellite, each of the plurality of contact points are configured to facilitate stacking of one or more additional satellites directly on top of the satellite.

* * * * *